US009469250B2

(12) United States Patent
Lynam

(10) Patent No.: US 9,469,250 B2
(45) Date of Patent: *Oct. 18, 2016

(54) VISION DISPLAY SYSTEM FOR VEHICLE

(71) Applicant: MAGNA ELECTRONICS INC., Auburn Hills, MI (US)

(72) Inventor: Niall R. Lynam, Holland, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/042,664

(22) Filed: Feb. 12, 2016

(65) Prior Publication Data

US 2016/0159283 A1    Jun. 9, 2016

Related U.S. Application Data

(63) Continuation of application No. 13/333,337, filed on Dec. 21, 2011, now Pat. No. 9,264,672.

(60) Provisional application No. 61/466,138, filed on Mar. 22, 2011, provisional application No. 61/452,816, filed on Mar. 15, 2011, provisional application No. 61/426,328, filed on Dec. 22, 2010.

(51) Int. Cl.
*H04N 9/47* (2006.01)
*B60R 1/00* (2006.01)
(Continued)

(52) U.S. Cl.
CPC ............... *B60R 1/00* (2013.01); *B60R 11/04* (2013.01); *B62D 15/0295* (2013.01);
(Continued)

(58) Field of Classification Search
CPC ... B60R 1/00; B60R 2300/105; B60R 11/04; B60R 2300/802; H04N 7/181

USPC .......................................................... 348/148
See application file for complete search history.

(56) References Cited

U.S. PATENT DOCUMENTS 4,200,361 A    4/1980 Malvano
4,214,266 A    7/1980 Myers
(Continued)

FOREIGN PATENT DOCUMENTS

DE    102007044535    3/2009
EP    0353200    1/1990
(Continued)

OTHER PUBLICATIONS

Achler et al., "Vehicle Wheel Detector using 2D Filter Banks," IEEE Intelligent Vehicles Symposium of Jun. 2004.
(Continued)

*Primary Examiner* — William C Vaughn, Jr.
*Assistant Examiner* — Daniel Tekle
(74) *Attorney, Agent, or Firm* — Gardner, Linn, Burkhart & Flory, LLP

(57) ABSTRACT

A vision display system for a vehicle includes at least a rear backup camera and a display system having a display screen disposed in the interior cabin of the vehicle and viewable by a driver of the vehicle. A tow check function includes a video zoom feature for use when reversing the vehicle towards a trailer so the driver of the vehicle can more readily align a trailer hitch of the vehicle with a tongue of the trailer the driver of the vehicle desires to hitch the vehicle to. The tow check function is actuatable by the driver of the vehicle prior to or during a reversing maneuver. Actuation of the tow check function zooms what is shown on the display screen from a broad view of where the trailer hitch is located to a narrower view of where the trailer hitch is located.

25 Claims, 17 Drawing Sheets

(51) Int. Cl.
  *B62D 15/02*    (2006.01)
  *H04N 7/18*    (2006.01)
  *B60R 11/04*    (2006.01)
  *H04N 5/225*    (2006.01)
  *H04N 5/232*    (2006.01)
  *H04N 5/247*    (2006.01)

(52) U.S. Cl.
  CPC ....... *H04N 5/2251* (2013.01); *H04N 5/23293* (2013.01); *H04N 5/23296* (2013.01); *H04N 5/247* (2013.01); *H04N 7/18* (2013.01); *B60R 2300/70* (2013.01)

(56) References Cited

U.S. PATENT DOCUMENTS

| | | |
|---|---|---|
| 4,218,698 A | 8/1980 | Bart et al. |
| 4,236,099 A | 11/1980 | Rosenblum |
| 4,247,870 A | 1/1981 | Gabel et al. |
| 4,249,160 A | 2/1981 | Chilvers |
| 4,254,931 A | 3/1981 | Aikens |
| 4,266,856 A | 5/1981 | Wainwright |
| 4,277,804 A | 7/1981 | Robison |
| 4,281,898 A | 8/1981 | Ochiai |
| 4,288,814 A | 9/1981 | Talley et al. |
| 4,355,271 A | 10/1982 | Noack |
| 4,357,558 A | 11/1982 | Massoni et al. |
| 4,381,888 A | 5/1983 | Momiyama |
| 4,420,238 A | 12/1983 | Felix |
| 4,431,896 A | 2/1984 | Lodetti |
| 4,443,057 A | 4/1984 | Bauer |
| 4,460,831 A | 7/1984 | Oettinger et al. |
| 4,481,450 A | 11/1984 | Watanabe et al. |
| 4,491,390 A | 1/1985 | Tong-Shen |
| 4,512,637 A | 4/1985 | Ballmer |
| 4,521,804 A | 6/1985 | Bendell |
| 4,529,275 A | 7/1985 | Ballmer |
| 4,529,873 A | 7/1985 | Ballmer |
| 4,532,550 A | 7/1985 | Bendell et al. |
| 4,546,551 A | 10/1985 | Franks |
| 4,549,208 A | 10/1985 | Kamejima et al. |
| 4,571,082 A | 2/1986 | Downs |
| 4,572,619 A | 2/1986 | Reininger |
| 4,580,875 A | 4/1986 | Bechtel |
| 4,600,913 A | 7/1986 | Caine |
| 4,603,946 A | 8/1986 | Kato |
| 4,614,415 A | 9/1986 | Hyatt |
| 4,620,141 A | 10/1986 | McCumber et al. |
| 4,623,222 A | 11/1986 | Itoh |
| 4,626,850 A | 12/1986 | Chey |
| 4,629,941 A | 12/1986 | Ellis |
| 4,630,109 A | 12/1986 | Barton |
| 4,632,509 A | 12/1986 | Ohmi |
| 4,638,287 A | 1/1987 | Umebayashi et al. |
| 4,645,975 A | 2/1987 | Meitzler et al. |
| 4,647,161 A | 3/1987 | Müller |
| 4,653,316 A | 3/1987 | Fukuhara |
| 4,669,825 A | 6/1987 | Itoh |
| 4,669,826 A | 6/1987 | Itoh |
| 4,671,615 A | 6/1987 | Fukada |
| 4,672,457 A | 6/1987 | Hyatt |
| 4,676,601 A | 6/1987 | Itoh |
| 4,690,508 A | 9/1987 | Jacob |
| 4,692,798 A | 9/1987 | Seko et al. |
| 4,697,883 A | 10/1987 | Suzuki |
| 4,701,022 A | 10/1987 | Jacob |
| 4,713,685 A | 12/1987 | Nishimura et al. |
| 4,717,830 A | 1/1988 | Botts |
| 4,727,290 A | 2/1988 | Smith |
| 4,731,669 A | 3/1988 | Hayashi et al. |
| 4,741,603 A | 5/1988 | Miyagi |
| 4,758,883 A | 7/1988 | Kawahara et al. |
| 4,768,135 A | 8/1988 | Kretschmer et al. |
| 4,772,942 A | 9/1988 | Tuck |
| 4,789,904 A | 12/1988 | Peterson |
| 4,793,690 A | 12/1988 | Gahan |
| 4,817,948 A | 4/1989 | Simonelli |
| 4,820,933 A | 4/1989 | Hong |
| 4,825,232 A | 4/1989 | Howdle |
| 4,838,650 A | 6/1989 | Stewart |
| 4,847,772 A | 7/1989 | Michalopoulos et al. |
| 4,855,822 A | 8/1989 | Narendra et al. |
| 4,862,037 A | 8/1989 | Farber et al. |
| 4,867,561 A | 9/1989 | Fujii et al. |
| 4,871,917 A | 10/1989 | O'Farrell et al. |
| 4,872,051 A | 10/1989 | Dye |
| 4,881,019 A | 11/1989 | Shiraishi et al. |
| 4,882,565 A | 11/1989 | Gallmeyer |
| 4,886,960 A | 12/1989 | Molyneux |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,907,870 A | 3/1990 | Brucker |
| 4,910,591 A | 3/1990 | Petrossian et al. |
| 4,916,374 A | 4/1990 | Schierbeek |
| 4,917,477 A | 4/1990 | Bechtel et al. |
| 4,937,796 A | 6/1990 | Tendler |
| 4,953,305 A | 9/1990 | Van Lente et al. |
| 4,956,591 A | 9/1990 | Schierbeek |
| 4,961,625 A | 10/1990 | Wood et al. |
| 4,967,319 A | 10/1990 | Seko |
| 4,970,653 A | 11/1990 | Kenue |
| 4,971,430 A | 11/1990 | Lynas |
| 4,974,078 A | 11/1990 | Tsai |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,075,768 A | 12/1991 | Wirtz et al. |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,148,014 A | 9/1992 | Lynam et al. |
| 5,166,681 A | 11/1992 | Bottesch et al. |
| 5,168,378 A | 12/1992 | Black et al. |
| 5,170,374 A | 12/1992 | Shimohigashi et al. |
| 5,172,235 A | 12/1992 | Wilm et al. |
| 5,177,606 A | 1/1993 | Koshizawa |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,245,422 A | 9/1993 | Borcherts et al. |
| 5,253,109 A | 10/1993 | O'Farrell et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |

(56) References Cited

U.S. PATENT DOCUMENTS

| | | |
|---|---|---|
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,487,116 A | 1/1996 | Nakano et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,312 A | 9/1996 | Shima et al. |
| 5,555,555 A | 9/1996 | Sato et al. |
| 5,568,027 A | 10/1996 | Teder |
| 5,574,443 A | 11/1996 | Hsieh |
| 5,576,687 A | 11/1996 | Blank et al. |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,668,663 A | 9/1997 | Varaprasad et al. |
| 5,670,935 A | 9/1997 | Schofield et al. |
| 5,675,489 A | 10/1997 | Pomerleau |
| 5,677,851 A | 10/1997 | Kingdon et al. |
| 5,699,044 A | 12/1997 | Van Lente et al. |
| 5,708,410 A | 1/1998 | Blank et al. |
| 5,712,640 A | 1/1998 | Andou et al. |
| 5,724,187 A | 3/1998 | Varaprasad et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayar |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,802,727 A | 9/1998 | Blank et al. |
| 5,825,527 A | 10/1998 | Forgette et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,605 A | 3/1999 | Knapp et al. |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,914,815 A | 6/1999 | Bos |
| 5,923,027 A | 7/1999 | Stam et al. |
| 5,926,117 A | 7/1999 | Gunji et al. |
| 5,929,786 A | 7/1999 | Schofield et al. |
| 5,940,120 A | 8/1999 | Frankhouse et al. |
| 5,949,331 A | 9/1999 | Schofield et al. |
| 5,956,181 A | 9/1999 | Lin |
| 5,959,367 A | 9/1999 | O'Farrell et al. |
| 5,959,555 A | 9/1999 | Furuta |
| 5,962,833 A | 10/1999 | Hayashi |
| 5,963,247 A | 10/1999 | Banitt |
| 5,964,822 A | 10/1999 | Alland et al. |
| 5,971,552 A | 10/1999 | O'Farrell et al. |
| 5,986,796 A | 11/1999 | Miles |
| 5,990,469 A | 11/1999 | Bechtel et al. |
| 5,990,649 A | 11/1999 | Nagao et al. |
| 6,001,486 A | 12/1999 | Varaprasad et al. |
| 6,002,983 A | 12/1999 | Alland et al. |
| 6,009,336 A | 12/1999 | Harris et al. |
| 6,020,704 A | 2/2000 | Buschur |
| 6,049,171 A | 4/2000 | Stam et al. |
| 6,052,645 A | 4/2000 | Harada |
| 6,066,933 A | 5/2000 | Ponziana |
| 6,084,519 A | 7/2000 | Coulling et al. |
| 6,087,953 A | 7/2000 | DeLine et al. |
| 6,097,023 A | 8/2000 | Schofield et al. |
| 6,097,024 A | 8/2000 | Stam et al. |
| 6,114,951 A | 9/2000 | Kinoshita et al. |
| 6,116,743 A | 9/2000 | Hoek |
| 6,124,647 A | 9/2000 | Marcus et al. |
| 6,124,886 A | 9/2000 | DeLine et al. |
| 6,139,172 A | 10/2000 | Bos et al. |
| 6,144,022 A | 11/2000 | Tenenbaum et al. |
| 6,170,956 B1 | 1/2001 | Rumsey et al. |
| 6,172,613 B1 | 1/2001 | DeLine et al. |
| 6,173,508 B1 | 1/2001 | Strohmeyer |
| 6,175,164 B1 | 1/2001 | O'Farrell et al. |
| 6,175,300 B1 | 1/2001 | Kendrick |
| 6,198,409 B1 | 3/2001 | Schofield et al. |
| 6,201,642 B1 | 3/2001 | Bos |
| 6,222,447 B1 | 4/2001 | Schofield et al. |
| 6,222,460 B1 | 4/2001 | DeLine et al. |
| 6,243,003 B1 | 6/2001 | DeLine et al. |
| 6,246,955 B1 | 6/2001 | Nishikawa et al. |
| 6,250,148 B1 | 6/2001 | Lynam |
| 6,259,412 B1 | 7/2001 | Duroux |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,291,906 B1 | 9/2001 | Marcus et al. |
| 6,294,989 B1 | 9/2001 | Schofield et al. |

(56) References Cited

U.S. PATENT DOCUMENTS

| | | |
|---|---|---|
| 6,297,781 B1 | 10/2001 | Turnbull et al. |
| 6,302,545 B1 | 10/2001 | Schofield et al. |
| 6,310,611 B1 | 10/2001 | Caldwell |
| 6,313,454 B1 | 11/2001 | Bos et al. |
| 6,315,419 B1 | 11/2001 | Platzer |
| 6,317,057 B1 | 11/2001 | Lee |
| 6,320,176 B1 | 11/2001 | Schofield et al. |
| 6,320,282 B1 | 11/2001 | Caldwell |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,523 B2 | 1/2002 | Lynam |
| 6,346,698 B1 | 2/2002 | Turnbull et al. |
| 6,353,392 B1 | 3/2002 | Schofield et al. |
| 6,360,170 B1 | 3/2002 | Ishikawa et al. |
| 6,366,213 B2 | 4/2002 | DeLine et al. |
| 6,370,329 B1 | 4/2002 | Teuchert |
| 6,396,397 B1 | 5/2002 | Bos et al. |
| 6,407,468 B1 | 6/2002 | Le Vesque et al. |
| 6,411,204 B1 | 6/2002 | Bloomfield et al. |
| 6,411,328 B1 | 6/2002 | Franke et al. |
| 6,420,800 B1 | 7/2002 | LeVesque et al. |
| 6,420,975 B1 | 7/2002 | DeLine et al. |
| 6,424,273 B1 | 7/2002 | Gutta et al. |
| 6,428,172 B1 | 8/2002 | Hutzel et al. |
| 6,430,303 B1 | 8/2002 | Naoi et al. |
| 6,433,676 B2 | 8/2002 | DeLine et al. |
| 6,433,817 B1 | 8/2002 | Guerra |
| 6,442,465 B2 | 8/2002 | Breed et al. |
| 6,477,464 B2 | 11/2002 | McCarthy et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,513,252 B1 | 2/2003 | Schierbeek et al. |
| 6,516,664 B2 | 2/2003 | Lynam |
| 6,523,964 B2 | 2/2003 | Schofield et al. |
| 6,534,884 B2 | 3/2003 | Marcus et al. |
| 6,539,306 B2 | 3/2003 | Turnbull |
| 6,547,133 B1 | 4/2003 | DeVries, Jr. et al. |
| 6,552,326 B2 | 4/2003 | Turnbull |
| 6,553,130 B1 | 4/2003 | Lemelson et al. |
| 6,559,435 B2 | 5/2003 | Schofield et al. |
| 6,572,233 B1 | 6/2003 | Northman et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,565 B2 | 7/2003 | Heslin et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,627,918 B2 | 9/2003 | Getz et al. |
| 6,631,316 B2 | 10/2003 | Stam et al. |
| 6,631,994 B2 | 10/2003 | Suzuki et al. |
| 6,636,258 B2 | 10/2003 | Strumolo |
| 6,642,851 B2 | 11/2003 | DeLine et al. |
| 6,648,477 B2 | 11/2003 | Hutzel et al. |
| 6,650,233 B2 | 11/2003 | DeLine et al. |
| 6,650,455 B2 | 11/2003 | Miles |
| 6,672,731 B2 | 1/2004 | Schnell et al. |
| 6,674,562 B1 | 1/2004 | Miles |
| 6,678,056 B2 | 1/2004 | Downs |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,434 B1 | 3/2004 | Sakoh et al. |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,737,630 B2 | 5/2004 | Turnbull et al. |
| 6,741,377 B2 | 5/2004 | Miles |
| 6,744,353 B2 | 6/2004 | Sjönell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,802,617 B2 | 10/2004 | Schofield et al. |
| 6,806,452 B2 | 10/2004 | Bos et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,831,261 B2 | 12/2004 | Schofield et al. |
| 6,847,487 B2 | 1/2005 | Burgner |
| 6,870,655 B1 | 3/2005 | Northman et al. |
| 6,882,287 B2 | 4/2005 | Schofield |
| 6,889,161 B2 | 5/2005 | Winner et al. |
| 6,891,563 B2 | 5/2005 | Schofield et al. |
| 6,909,753 B2 | 6/2005 | Meehan et al. |
| 6,946,978 B2 | 9/2005 | Schofield |
| 6,953,253 B2 | 10/2005 | Schofield et al. |
| 6,968,736 B2 | 11/2005 | Lynam |
| 6,975,775 B2 | 12/2005 | Rykowski et al. |
| 7,004,593 B2 | 2/2006 | Weller et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,046,448 B2 | 5/2006 | Burgner |
| 7,050,908 B1 | 5/2006 | Schwartz et al. |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,095,567 B2 | 8/2006 | Troxell et al. |
| 7,111,968 B2 | 9/2006 | Bauer et al. |
| 7,116,246 B2 | 10/2006 | Winter et al. |
| 7,123,168 B2 | 10/2006 | Schofield |
| 7,133,661 B2 | 11/2006 | Hatae et al. |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,167,796 B2 | 1/2007 | Taylor et al. |
| 7,168,830 B2 | 1/2007 | Pastrick et al. |
| 7,175,291 B1 | 2/2007 | Li |
| 7,184,190 B2 | 2/2007 | McCabe et al. |
| 7,190,281 B2 | 3/2007 | Nagasawa et al. |
| 7,195,381 B2 | 3/2007 | Lynam et al. |
| 7,202,776 B2 | 4/2007 | Breed |
| 7,206,697 B2 | 4/2007 | Olney et al. |
| 7,224,324 B2 | 5/2007 | Quist et al. |
| 7,227,459 B2 | 6/2007 | Bos et al. |
| 7,227,472 B1 | 6/2007 | Roe |
| 7,227,611 B2 | 6/2007 | Hull et al. |
| 7,230,640 B2 | 6/2007 | Regensburger et al. |
| 7,245,231 B2 | 7/2007 | Kiefer et al. |
| 7,248,283 B2 | 7/2007 | Takagi et al. |
| 7,248,718 B2 | 7/2007 | Comaniciu et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,265,656 B2 | 9/2007 | McMahon et al. |
| 7,274,501 B2 | 9/2007 | McCabe et al. |
| 7,289,037 B2 | 10/2007 | Uken et al. |
| 7,295,229 B2 | 11/2007 | Kumata et al. |
| 7,301,466 B2 | 11/2007 | Asai et al. |
| 7,302,344 B2 | 11/2007 | Olney et al. |
| 7,308,341 B2 | 12/2007 | Schofield et al. |
| 7,311,406 B2 | 12/2007 | Schofield et al. |
| 7,317,386 B2 | 1/2008 | Lengning et al. |
| 7,324,043 B2 | 1/2008 | Purden et al. |
| 7,325,934 B2 | 2/2008 | Schofield et al. |
| 7,325,935 B2 | 2/2008 | Schofield et al. |
| 7,327,226 B2 | 2/2008 | Turnbull et al. |
| 7,329,013 B2 | 2/2008 | Blank et al. |
| 7,331,415 B2 | 2/2008 | Hawes et al. |
| 7,338,177 B2 | 3/2008 | Lynam |
| 7,339,149 B1 | 3/2008 | Schofield et al. |
| 7,344,261 B2 | 3/2008 | Schofield et al. |
| 7,349,582 B2 | 3/2008 | Takeda et al. |
| 7,355,524 B2 | 4/2008 | Schofield |

(56) References Cited

U.S. PATENT DOCUMENTS

| | | |
|---|---|---|
| 7,360,932 B2 | 4/2008 | Uken et al. |
| 7,368,714 B2 | 5/2008 | Remillard et al. |
| 7,370,983 B2 | 5/2008 | DeWind et al. |
| 7,375,803 B1 | 5/2008 | Bamji |
| 7,379,817 B1 | 5/2008 | Tyson et al. |
| 7,380,633 B2 | 6/2008 | Shen et al. |
| 7,380,948 B2 | 6/2008 | Schofield et al. |
| 7,388,182 B2 | 6/2008 | Schofield et al. |
| 7,391,563 B2 | 6/2008 | McCabe et al. |
| 7,402,786 B2 | 7/2008 | Schofield et al. |
| 7,423,248 B2 | 9/2008 | Schofield et al. |
| 7,423,821 B2 | 9/2008 | Bechtel et al. |
| 7,425,076 B2 | 9/2008 | Schofield et al. |
| 7,446,650 B2 | 11/2008 | Scholfield et al. |
| 7,459,664 B2 | 12/2008 | Schofield et al. |
| 7,488,099 B2 | 2/2009 | Fogg et al. |
| 7,526,103 B2 | 4/2009 | Schofield et al. |
| 7,541,743 B2 | 6/2009 | Salmeen et al. |
| 7,561,181 B2 | 7/2009 | Schofield et al. |
| 7,565,006 B2 | 7/2009 | Stam et al. |
| 7,581,859 B2 | 9/2009 | Lynam |
| 7,592,928 B2 | 9/2009 | Chinomi et al. |
| 7,616,781 B2 | 11/2009 | Schofield et al. |
| 7,619,508 B2 | 11/2009 | Lynam et al. |
| 7,626,749 B2 | 12/2009 | Baur et al. |
| 7,633,383 B2 | 12/2009 | Dunsmoir et al. |
| 7,639,149 B2 | 12/2009 | Katoh |
| 7,655,894 B2 | 2/2010 | Schofield et al. |
| 7,676,087 B2 | 3/2010 | Dhua et al. |
| 7,720,580 B2 | 5/2010 | Higgins-Luthman |
| 7,792,329 B2 | 9/2010 | Schofield et al. |
| 7,843,451 B2 | 11/2010 | Lafon |
| 7,855,755 B2 | 12/2010 | Weller et al. |
| 7,855,778 B2 | 12/2010 | Yung et al. |
| 7,859,565 B2 | 12/2010 | Schofield et al. |
| 7,877,175 B2 | 1/2011 | Higgins-Luthman |
| 7,881,496 B2 | 2/2011 | Camilleri |
| 7,914,187 B2 | 3/2011 | Higgins-Luthman et al. |
| 7,930,160 B1 | 4/2011 | Hosagrahara et al. |
| 7,991,522 B2 | 8/2011 | Higgins-Luthman |
| 7,994,462 B2 | 8/2011 | Schofield et al. |
| 8,017,898 B2 | 9/2011 | Lu et al. |
| 8,095,310 B2 | 1/2012 | Taylor et al. |
| 8,098,142 B2 | 1/2012 | Schofield et al. |
| 8,194,133 B2 * | 6/2012 | DeWind ............... B60K 35/00 348/148 |
| 8,203,440 B2 | 6/2012 | Schofield et al. |
| 8,222,588 B2 | 7/2012 | Schofield et al. |
| 8,224,031 B2 | 7/2012 | Saito |
| 8,314,689 B2 | 11/2012 | Schofield et al. |
| 8,324,552 B2 | 12/2012 | Schofield et al. |
| 8,386,114 B2 | 2/2013 | Higgins-Luthman et al. |
| 9,264,672 B2 | 2/2016 | Lynam |
| 2002/0005778 A1 | 1/2002 | Breed |
| 2002/0113873 A1 | 8/2002 | Williams |
| 2002/0167589 A1 | 11/2002 | Schofield et al. |
| 2003/0137586 A1 | 7/2003 | Lewellen |
| 2003/0222982 A1 | 12/2003 | Hamdan et al. |
| 2004/0164228 A1 | 8/2004 | Fogg et al. |
| 2005/0219852 A1 | 10/2005 | Stam et al. |
| 2005/0222753 A1 | 10/2005 | Ishikawa |
| 2005/0237385 A1 | 10/2005 | Kosaka et al. |
| 2006/0018511 A1 | 1/2006 | Stam et al. |
| 2006/0018512 A1 | 1/2006 | Stam et al. |
| 2006/0050018 A1 | 3/2006 | Hutzel et al. |
| 2006/0091813 A1 | 5/2006 | Stam et al. |
| 2006/0103727 A1 | 5/2006 | Tseng |
| 2006/0250501 A1 | 11/2006 | Widmann et al. |
| 2007/0104476 A1 | 5/2007 | Yasutomi et al. |
| 2007/0109406 A1 | 5/2007 | Schofield et al. |
| 2007/0120657 A1 | 5/2007 | Schofield et al. |
| 2007/0188347 A1 | 8/2007 | Schofield |
| 2007/0242339 A1 | 10/2007 | Bradley |
| 2008/0068520 A1 | 3/2008 | Minikey, Jr. et al. |
| 2008/0147321 A1 | 6/2008 | Howard et al. |
| 2008/0192132 A1 | 8/2008 | Bechtel et al. |
| 2009/0113509 A1 | 4/2009 | Tseng et al. |
| 2009/0160987 A1 | 6/2009 | Bechtel et al. |
| 2009/0190015 A1 | 7/2009 | Bechtel et al. |
| 2009/0256938 A1 | 10/2009 | Bechtel et al. |
| 2010/0066833 A1 | 3/2010 | Ohshima et al. |
| 2010/0082281 A1 | 4/2010 | Nakamura et al. |
| 2010/0097469 A1 | 4/2010 | Blank et al. |
| 2010/0201816 A1 * | 8/2010 | Lee ..................... B60R 1/12 348/148 |
| 2011/0304691 A1 | 12/2011 | Newton et al. |
| 2012/0045112 A1 | 2/2012 | Lundblad et al. |
| 2012/0062743 A1 | 3/2012 | Lynam et al. |
| 2012/0078469 A1 | 3/2012 | Karner et al. |
| 2012/0154591 A1 | 6/2012 | Baur et al. |
| 2012/0265416 A1 * | 10/2012 | Lu ..................... B60R 1/00 701/70 |
| 2014/0022390 A1 | 1/2014 | Blank et al. |

FOREIGN PATENT DOCUMENTS

| | | |
|---|---|---|
| EP | 0426503 | 5/1991 |
| EP | 0492591 | 7/1992 |
| EP | 0640903 | 3/1995 |
| EP | 0788947 | 8/1997 |
| EP | 1074430 | 2/2001 |
| JP | 59114139 | 7/1984 |
| JP | 6079889 | 5/1985 |
| JP | 6080953 | 5/1985 |
| JP | 6272245 | 5/1987 |
| JP | S62131837 | 6/1987 |
| JP | 6414700 | 1/1989 |
| JP | 03099952 | 4/1991 |
| JP | 4114587 | 4/1992 |
| JP | H04127280 | 4/1992 |
| JP | 0577657 | 3/1993 |
| JP | 05050883 | 3/1993 |
| JP | 5213113 | 8/1993 |
| JP | 6227318 | 8/1994 |
| JP | 06267304 | 9/1994 |
| JP | 06276524 | 9/1994 |
| JP | 06295601 | 10/1994 |
| JP | 07004170 | 1/1995 |
| JP | 0732936 | 2/1995 |
| JP | 0747878 | 2/1995 |
| JP | 07052706 | 2/1995 |
| JP | 0769125 | 3/1995 |
| JP | 07105496 | 4/1995 |
| JP | 2630604 | 7/1997 |
| JP | 200274339 | 3/2002 |
| JP | 2003083742 | 3/2003 |
| JP | 20041658 | 1/2004 |
| JP | 2007288586 | 11/2007 |
| WO | WO9419212 | 2/1994 |
| WO | WO9638319 | 12/1996 |
| WO | WO2012/145818 | 11/2012 |
| WO | WO2013/074604 | 5/2013 |
| WO | WO2013/086249 | 6/2013 |

OTHER PUBLICATIONS

Bow, Sing T., "Pattern Recognition and Image Preprocessing (Signal Processing and Communications)", CRC Press, Jan. 15, 2002, pp. 557-559.

Broggi et al., "Automatic Vehicle Guidance: The Experience of the ARGO Vehicle", World Scientific Publishing Co., 1999.

Broggi et al., "Multi-Resolution Vehicle Detection using Artificial Vision," IEEE Intelligent Vehicles Symposium of Jun. 2004.

Borenstein et al., "Where am I? Sensors and Method for Mobile Robot Positioning", University of Michigan, Apr. 1996, pp. 2, 125-128.

Kastrinaki et al., "A survey of video processing techniques for traffic applications".

Mei Chen et al., Aurora: A Vision-Based Roadway Departure Warning System, The Robotics Institute, Carnegie Mellon University, published Aug. 9, 1995.

(56) References Cited

OTHER PUBLICATIONS

Parker (ed.), McGraw-Hill Dictionary of Scientific and Technical Terms Fifth Edition (1993).
Philomin et al., "Pedestrain Tracking from a Moving Vehicle".
Pratt, "Digital Image Processing, Passage—Ed.3", John Wiley & Sons, US, Jan. 1, 2001, pp. 657-659, XP002529771.
Sun et al., "On-road vehicle detection using optical sensors: a review".
Tokimaru et al., "CMOS Rear-View TV System with CCD Camera", National Technical Report vol. 34, No. 3, pp. 329-336, Jun. 1988 (Japan).
Van Leeuwen et al., "Motion Estimation with a Mobile Camera for Traffic Applications", IEEE, US, vol. 1, Oct. 3, 2000, pp. 58-63.
Van Leeuwen et al., "Motion Interpretation for In-Car Vision Systems", IEEE, US, vol. 1, Sep. 30, 2002, p. 135-140.
Van Leeuwen et al., "Requirements for Motion Estimation in Image Sequences for Traffic Applications", IEEE, US, vol. 1, May 24, 1999, pp. 145-150, XP010340272.
Van Leeuwen et al., "Real-Time Vehicle Tracking in Image Sequences", IEEE, US, vol. 3, May 21, 2001, pp. 2049-2054, XP010547308.
Vellacott, Oliver, "CMOS in Camera," IEE Review, pp. 111-114 (May 1994).
Vlacic et al., (Eds), "Intelligent Vehicle Tecnologies, Theory and Applications", Society of Automotive Engineers Inc., edited by SAE International, 2001.
Wang et al., CMOS Video Cameras, article, 1991, 4 pages, University of Edinburgh, UK.
Zheng et al., "An Adaptive System for Traffic Sign Recognition," IEEE Proceedings of the Intelligent Vehicles '94 Symposium, pp. 165-170 (Oct. 1994).

\* cited by examiner

Federal Register: December 7, 2010 (Volume 75, Number 234)

Page 76185-76250

Part IV
Department of Transportation
National Highway Traffic Safety Administration 49 CFR Parts 571 and 585
[Docket No.: NHTSA-2010-0162]

RIN 2127-AK43

Federal Motor Vehicle Safety Standard, Rearview Mirrors; Federal Motor Vehicle Safety Standard, Low-Speed Vehicles Phase-In Reporting Requirements; Proposed Rule

FIG. 2

S6.2.1.1 Field of view.
When tested in accordance with the procedures in S14.1 through S14.2.3, the rearview image shall display, in a location visible to a driver properly restrained by seat belts:
  (a) a minimum of a 150-mm wide portion of each test object located at positions F and G in Figure 5; and
  (b) the full width and height of each test object located at positions A through E in Figure 5.

S6.2.1.2 Size.
When the rearview image is measured in accordance with the procedures in S14.1 through S14.2.3, the calculated visual angle—subtended by the horizontal width of:
  (a) the three test objects located at positions A, B, and C in Figure 5 shall average not less than 5 minutes of arc; and
  (b) the angular size of each individual test object (A, B, and C) shall not be less than 3 minutes of arc.

FIG. 3

- Rear Visibility
  - The rear view image shall display a 150 mm wide portion of test objects F & G and the full width & height of test objects A through E as positioned in FIGS. 6 and 7.
  - Test objects F & G are marked with a 150 mm wide colored vertical stripe established on a contrast-colored background — the stripe shall be faced towards the camera as shown in FIG. 7.
  - Test objects F & G meet the NHTSA requirements if the display can show the full width of the colored vertical stripe at at least a portion of the test object. This is met by there being at least some amount of contrast-colored background on both sides of the stripe visible on the display. It is not necessary to see the full width & height of test objects F & G. See FIG. 7 for a sample image.
  - Test objects A-E meet the NHTSA requirements if their full width & height are visible in the display as shown in FIG. 7.

FIG. 4

| Distance (inches) of Test Object displayed on screen from driver's eyes | Min. width (mm) of Test Object on screen that subtends a min. 5 minutes of arc angle |
|---|---|
| 15 | 0.55 |
| 20 | 0.74 |
| 22 | 0.81 |
| 24 | 0.89 |
| 26 | 0.96 |
| 28 | 1.03 |
| 30 | 1.11 |
| 32 | 1.18 |
| 34 | 1.26 |
| 36 | 1.33 |
| 38 | 1.4 |
| 40 | 1.48 |
| 45 | 1.66 |
| 50 | 1.85 |

FIG. 8

Rear Video Image as captured by the rear backup camera

Video Screen viewable by the driver when reversing

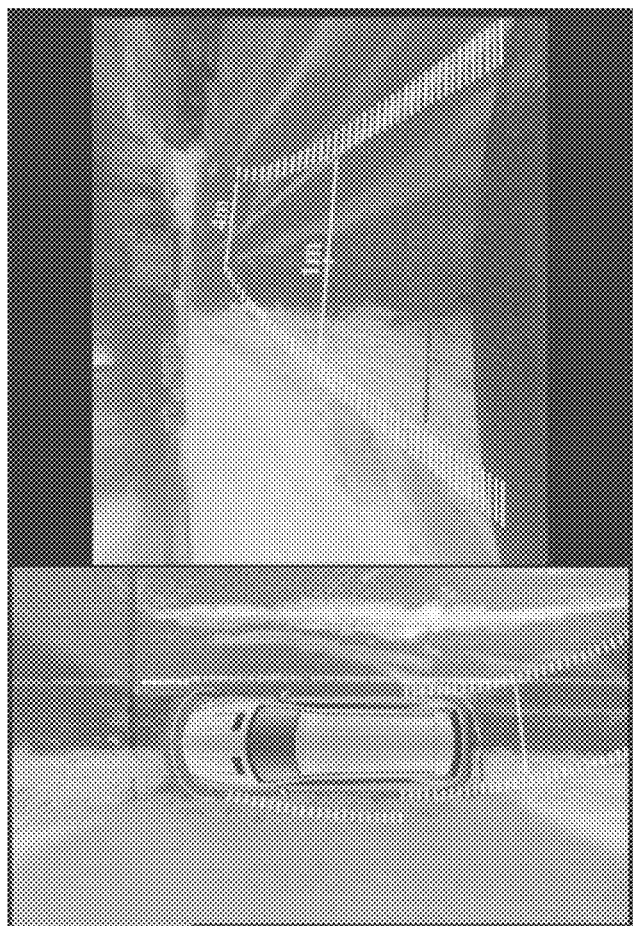

Video Screen viewable by the driver when reversing

Rear Video Image as captured by the rear backup camera

Surround View Image that is a composite image computer-generated from video images captured by at least four cameras, one of which is the rear backup camera and the other at least three comprise a camera mounted at/in each of the two exterior mirror assemblies and a third forward-facing camera mounted at the front of the vehicle (often at the front grille but it also can view forwardly through the windshield)

FIG. 10

*Features:*
- EC/Video LED indicator. Day (full) intensity only.
- No Non-Volatile required.
- Rear sensor thru glass sensing for LCM dimming and EC functions.
- Thermal algorithms for fail safe LCM operation.
- Dual Outside EC.
- Camera power provided from VideoMirror. 6.6V nominal. 200mA max.
- Switch disable/enables EC and Video.

Mirror button function / control Table 1A

| Switch Function | (Ignition On) | |
|---|---|---|
| | *Not in Reverse* | *In Reverse* |
| Momentary | EC on/off<br><br>LED on/off (follows EC state.) | Display on/off<br><br>(LED does not change state except for blinking) |

- Camera will be powered at 150 mS ± 50mS after reverse.
- Camera will be un-powered 60 seconds after reverse is removed.
- LCM default is enabled (ON) at each new Ignition cycle.
- LCM state is remembered after Reverse cycle. (if turned on/off, will remain on/off until button is pressed again in reverse or an ignition cycle)
- LCM display will show a stable video image at 1200mS + 300mS after reverse is activated. (Given camera signal is stable at that time)
- LCM shall detect (and turn off the display with no flicker) when the Video signal is broken i.e., Video plus and/or Video minus disconnected.
- LCM will shut off immediately after the reverse signal is removed. Optional: delay feature hardware selectable.
- LED indicator
- No video at 1200mS + 300mS in reverse response:
  o Turn off backlight and blink LED at 1Hz.
  o Enable video display immediately when a good camera video signal becomes present while flashing.

VideoMirror (DoD) illumination targeted at 1500cd/m².

FIG. 16

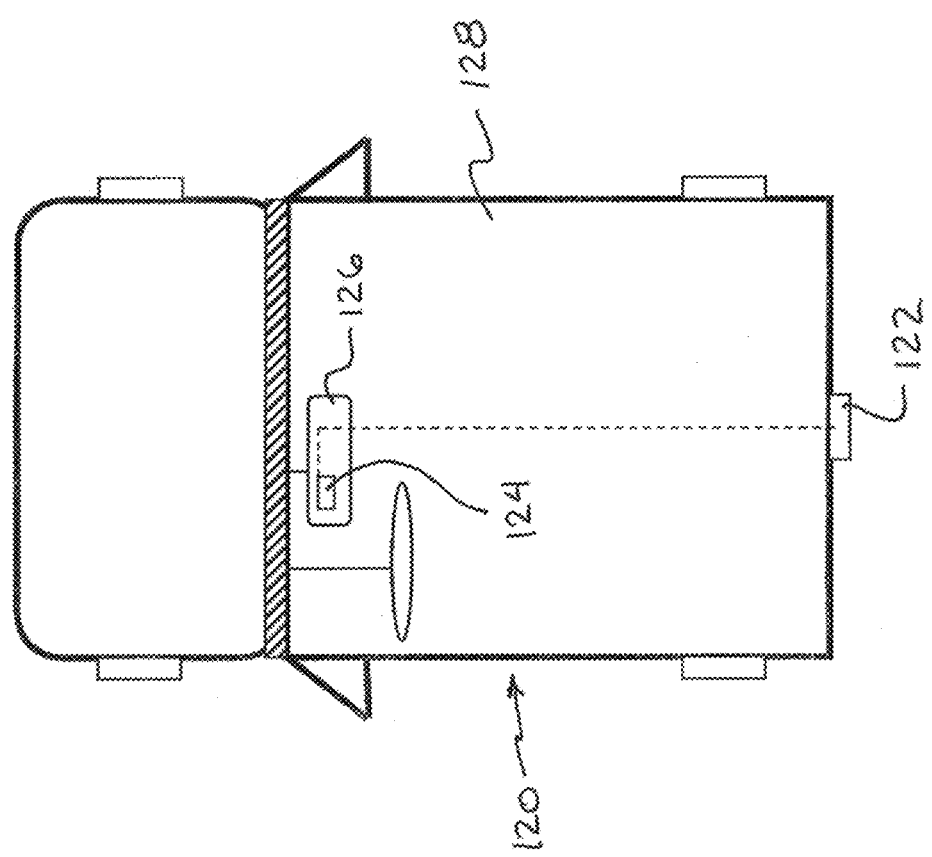

VISION DISPLAY SYSTEM FOR VEHICLE

CROSS REFERENCE TO RELATED APPLICATIONS

The present application is a continuation of U.S. patent application Ser. No. 13/333,337, filed Dec. 21, 2011, now U.S. Pat. No. 9,264,672, which is related to U.S. provisional applications, Ser. No. 61/466,138, filed Mar. 22, 2011; Ser. No. 61/452,816, filed Mar. 15, 2011; and Ser. No. 61/426,328, filed Dec. 22, 2010, which are hereby incorporated herein by reference in their entireties.

FIELD OF THE INVENTION

The present invention relates to vision display systems for vehicles and, more particularly, to a vision display system that selectively displays rearward images captured during a reversing maneuver and display a surround view or bird's-eye view or representation of the vehicle for viewing by the driver of the vehicle when the driver is operating the vehicle.

BACKGROUND OF THE INVENTION

Rear backup cameras and surround vision/panoramic vision systems used in conjunction with interior rearview video mirrors and instrument panel/center console information screens (such as navigation screens) are known for use in vehicles. Examples of such systems are described in U.S. Pat. Nos. 7,859,565; 6,611,202; 6,222,447; 5,949,331; 5,670,935 and/or 5,550,677, which are hereby incorporated herein by reference in their entireties. It is known to display images captured by a rearward viewing imaging sensor or camera on a video display screen that is associated with or incorporated in an interior rearview video mirror assembly of the vehicle. Such interior rearview video mirror display screens typically have about a 3.5 inch or thereabouts diagonal dimension and a 4:3 or 16:9 aspect ratio, while instrument panel/center console screens (commonly used for navigational screens but also used and usable for displaying infotainment information or other information useful to the driver of the vehicle) typically have a larger diagonal dimension, often greater than about 6 inches diagonal dimension (such as 7.8 inches or thereabouts) and are used for likes of displaying map information and/or driving instructions and/or other information relating to vehicle features or functions. The smaller video mirror display screens are located in the interior rearview mirror assembly of the vehicle and thus are typically disposed in the vehicle at a location that is closer to the driver's eyes than other known or typical or conventional in-cabin and driver-viewable display screens, which are often disposed at the instrument panel or a central console or the like of the vehicle. Such instrument panel or a central console displays can be as large as 8.5 inch diagonal dimension (or even larger in some vehicles) whereas, because of the fit and function in the vehicle of the interior rearview mirror assembly, the video screen in an interior video mirror assembly is restricted in size to, in practical terms, a diagonal dimension of up to 4 inches or thereabouts.

It is also known to provide a surround view or "bird's-eye" view display (showing a representation of the vehicle from a top or bird's-eye view above the vehicle to enhance the driver's understanding of the areas surrounding the vehicle for use such as in parking maneuvers and the like) via a surround system vision such as a camera or vision system of the type shown in FIG. 1 (showing a vehicle 10 with a forward viewing camera 12, side-viewing cameras 14, 16 disposed at or in the exterior sideview mirror assemblies and a rearward viewing camera 18). Such a bird's-eye view or image or representation may be displayed on a 3.5 inch diagonal video mirror display and are typically displayed on larger (such as greater than about 5 inches diagonal dimension) display screens, such as larger display screens disposed at a center console or instrument panel of the vehicle, such as for displaying navigation information or infotainment information (such as radio or audio system information) and/or the like. In such conventional bird's-eye view displays, it is common and desirable, when executing a reversing maneuver, to display to the driver both the actual video images captured in real time by the rear backup camera of the equipped vehicle, and also to display to the driver a bird's-eye composite or synthetic view (sometimes called a top-down view) where the video images captured by the rear camera are combined with video images captured by a forward viewing camera, typically at the grille at the front of the vehicle, and by two exterior mirror-located cameras mounted respectively in the exterior sideview mirrors and having a field of view to the respective side of the vehicle. Examples of bird's eye view systems and associated techniques are described in U.S. Pat. Nos. 5,670,935; 6,636,258; 7,145,519; 7,161,616; 7,230,640; 7,248,283; 7,295,229; 7,301,466 and/or 7,592,928, and/or International Publication No. WO 2010/099416, published Sep. 2, 2010, and/or PCT Application No. PCT/US10/47256, filed Aug. 31, 2010, which are hereby incorporated herein by reference in their entireties. Conventionally, the bird's-eye view and view of the rearward images being captured by the rear-mounted camera as part of a rear backup aid are displayed on a single display screen, typically a center console display screen.

Recently, the Department of Transportation, National Highway Traffic Safety Administration (NHTSA) has issued a Notice of Proposed new Rule Making (NPRM). The caption of the NPRM is shown in FIG. 2 and aspects of the proposed Final Rule are summarized/captured in FIGS. 3-5. The NPRM was printed in the Federal Register: Dec. 7, 2010 (Vol. 75, No. 234), pages 76185-76250; Part IV, Department of Transportation, National Highway Traffic Safety Administration, 49 CFR Parts 571 and 585, RIN 2127-AK43, and titled Federal Motor Vehicle Safety Standard, Rearview Mirrors; Federal Motor Vehicle Safety Standard, Low-Speed Vehicles Phase-In Reporting Requirements; Proposed Rule, the entirety of which is hereby incorporated herein by reference. The NPRM at S6.2.1.1 requires and specifies a rearview image performance such that, when tested in accordance with the procedures in S14.1 through S14.2.3 of the NPRM, the rearview image shall display, in a location visible to a driver properly restrained by seat belts, a minimum of a 150 mm wide portion of each test object located at positions F and G in FIG. 5. Also, and in accordance with S6.2.1.2 of the NPRM, when the rearview image is measured in accordance with the procedures in S14.1 through S14.2.3 of the NPRM, (a) the calculated visual angle subtended by the horizontal width of the three test objects located at positions A, B, and C in FIG. 5 shall average not less than 5 minutes of arc; and (b) the angular size of each individual test object (A, B, and C) shall not be less than 3 minutes of arc.

As can be seen with reference to FIG. 7, in order to have a displayed object subtend a minimum of 5 minutes of arc angle, the display size of the target object (dependent on the distance of the displayed object from the driver's eyes) shown on the screen should be around 0.5 mm to 2 mm or thereabouts where the distance from the eyes of the viewer to the screen is between about 15 inches and about 50 inches.

SUMMARY OF THE INVENTION

The present invention provides a vision display system for a vehicle that utilizes a video mirror display screen to display rearward images captured by a rearward viewing camera of the vehicle at an interior rearview video mirror assembly during a reversing maneuver of the vehicle and that utilizes a separate larger center console or instrument panel display screen of the vehicle (such as a reconfigurable liquid crystal display (LCD) or organic light emitting diode (OLED) screen that may typically or commonly be used for displaying navigation information or infotainment information or other information) to display a surround view or bird's-eye view or representation of the vehicle at the navigation screen during the reversing maneuver of the vehicle.

According to an aspect of the present invention, a vision display system for a vehicle includes a plurality of cameras disposed at the vehicle and having exterior fields of view, with the plurality of cameras at least comprising a rearward viewing camera disposed at the rear of the vehicle, a forward viewing camera disposed at the front of the vehicle, a driver-side viewing camera and a passenger-side viewing camera (with the driver-side viewing camera and the passenger-side viewing camera preferably incorporated into the driver-side exterior sideview mirror assembly and the passenger-side exterior sideview mirror assembly, respectively). The vision display system includes a first display screen disposed, preferably, in an interior rearview video mirror assembly of the vehicle (such as behind the mirror reflective element so that information displayed by the first display screen is viewable through the reflective element of the interior rearview video mirror assembly, and preferably is viewable through the mirror reflector of the reflective element of the interior rearview mirror assembly). The first display screen has a first diagonal dimension and a first aspect ratio. The vision display system includes a second display screen disposed in the vehicle cabin other than in the interior rearview mirror assembly of the vehicle and at a location viewable by the driver when normally operating the equipped vehicle, such as at or in a console or instrument panel of the vehicle, with the second display screen having a second diagonal dimension and a second aspect ratio, and with the second diagonal dimension being greater than the first diagonal dimension. The first display screen is operable to display video images captured by the rearward viewing camera during a reversing maneuver of the vehicle and the second display screen (during that reversing maneuver) displays a surround view, panoramic, bird's-eye view or top view image formed as a composite image derived from and synthesized from image data captured by the rearward, forward, driver side and passenger side viewing cameras during that reversing maneuver of the vehicle.

The first display screen preferably comprises a video display screen in the interior rearview mirror assembly disposed behind the mirror reflective element (and most preferably disposed behind, and rendered covert thereby when not backlit, a transflective mirror reflector of the mirror reflective element), such as a backlit liquid crystal display screen or backlit thin film transistor (TFT) liquid crystal display screen (backlit by a plurality of light emitting diodes or the like), such as a display screen of the types described in U.S. Pat. Nos. 6,690,268; 7,184,190; 7,274, 501; 7,370,983; 7,446,650 and/or 7,855,755, and/or U.S. patent application Ser. No. 10/538,724, filed Jun. 13, 2005 and published Mar. 9, 2006 as U.S. Publication No. US-2006-0050018, which are all hereby incorporated herein by reference in their entireties. The first display screen may be operable to display rearward images responsive to the driver of the vehicle shifting to a reverse gear of the vehicle during reversing of the vehicle, such as is disclosed in U.S. patent application Ser. No. 13/285,128, filed Oct. 31, 2011, now U.S. Pat. No. 8,743,203, which is hereby incorporated herein by reference in its entirety.

The second display screen may comprise a larger display screen (such as a display screen having a diagonal dimension of at least about 5 inches or at least about 7 inches or thereabouts). The second display screen may also function to display navigation information and/or infotainment information and/or other information for viewing and use by the driver of the vehicle when the driver is operating the vehicle other than when executing a reversing maneuver.

Should the driver dwell in reverse gear for a prolonged period of time, the display luminance of at least the first display screen may reduce to mitigate/reduce heat build-up due to prolonged backlighting but is controlled such that, at high ambient lighting conditions such as encountered on a sunny day, a display luminance at least of the first display screen of greater or equal than 500 candelas/square meter is preserved.

These and other objects, advantages, purposes and features of the present invention will become apparent upon review of the following specification in conjunction with the drawings.

BRIEF DESCRIPTION OF THE DRAWINGS

FIG. 2 identifies the NPRM that is summarized in FIGS. 3-5 and that requires minimum display size of targets in images captured by a vehicular camera;

FIG. 8 is a table that lists the minimum width of a test object as displayed on a display screen for display screens at different distances from the driver's eyes, in order to provide a displayed size that subtends a minimum of 5 minutes of arc angle, in order to meet the test standards summarized in FIGS. 3-5;

FIG. 10 is a surround view or bird's-eye view image as displayed adjacent to the rearward video image of FIG. 9;

FIG. 16 is a table showing aspects of a video display system and backup assist system of the present invention; and FIG. 17 is a schematic of another vision display system in accordance with the present invention.

DESCRIPTION OF THE PREFERRED EMBODIMENTS

The present invention provides a surround vision display system that is operable to display, such as during a reversing maneuver of the vehicle, rearward video images at a video display screen disposed at or in an interior rearview mirror assembly of the vehicle, and is operable to display surround view or bird's-eye view or panoramic-view images or representations at a display screen disposed at or in an instrument panel or center console or the like of the vehicle. The rearward video images are captured by a rearward viewing camera of the vehicle, while the surround view display information is based on image data captured by multiple cameras disposed at the vehicle with exterior fields of view, these multiple cameras typically including the rearward viewing camera of the vehicle (that functions as a rear backup camera when reversing the equipped vehicle). The present invention thus may provide, for example, a 3.5 inch or thereabouts diagonal interior rearview video mirror display (or other size video display at or in the mirror assembly) and a 7.8 inch or thereabouts diagonal display screen (or other size display screen that may typically be used with a navigational and/or infotainment system of the vehicle to display likes map images and driving instructions as part of a vehicle-based navigation system or infotainment systems or the like).

Figure 1:
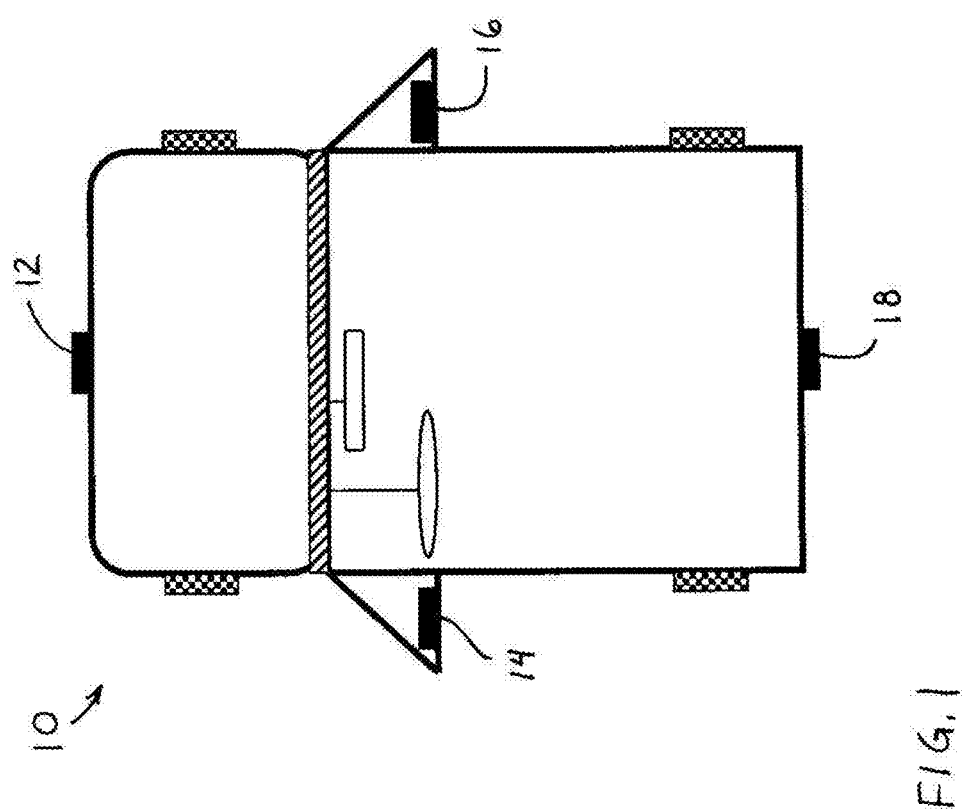
FIG. 1 is a plan view of a vehicle with a surround vision display system and multiple cameras with exterior fields of view.
Figure 5:
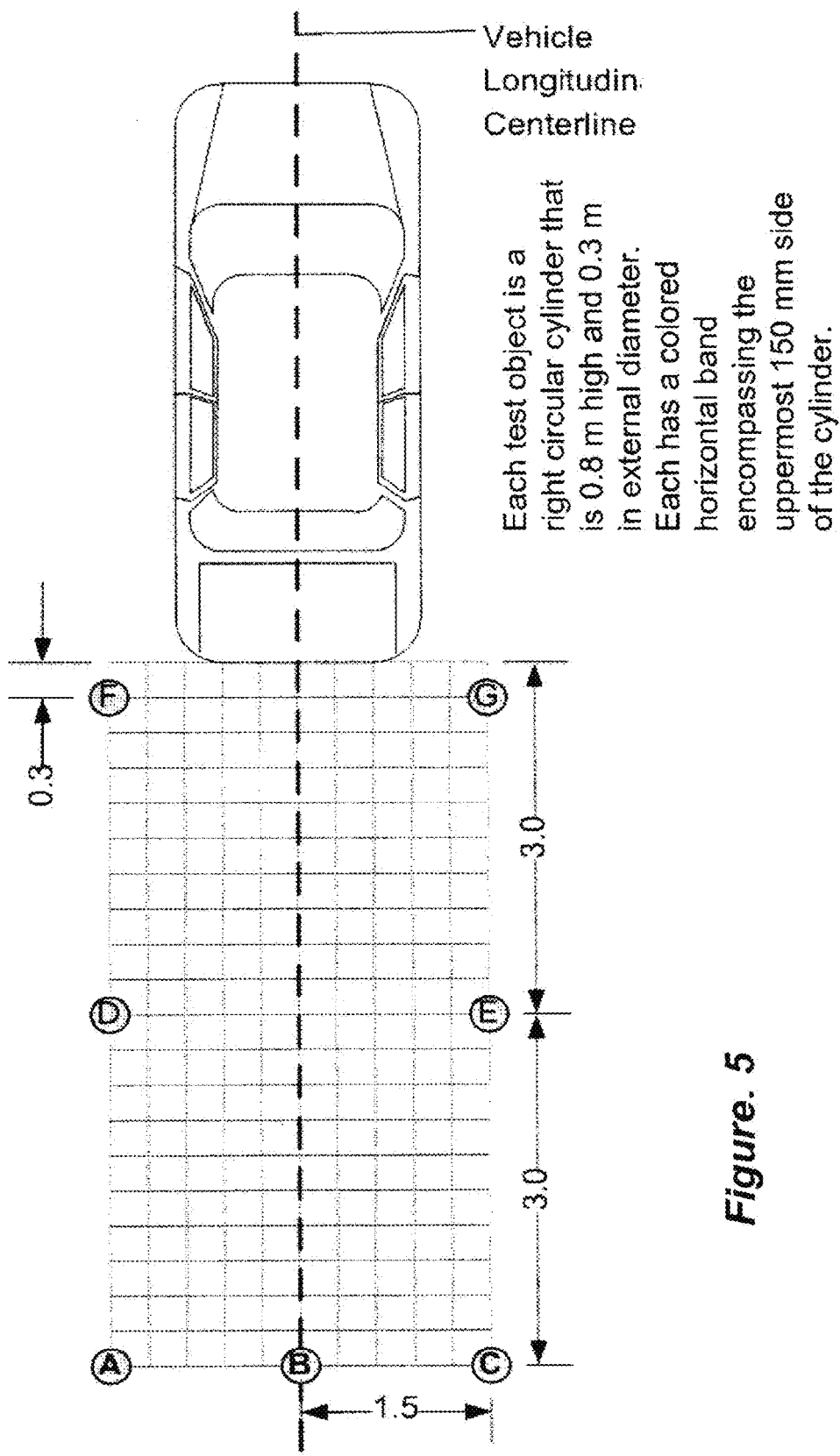
Figure 6:
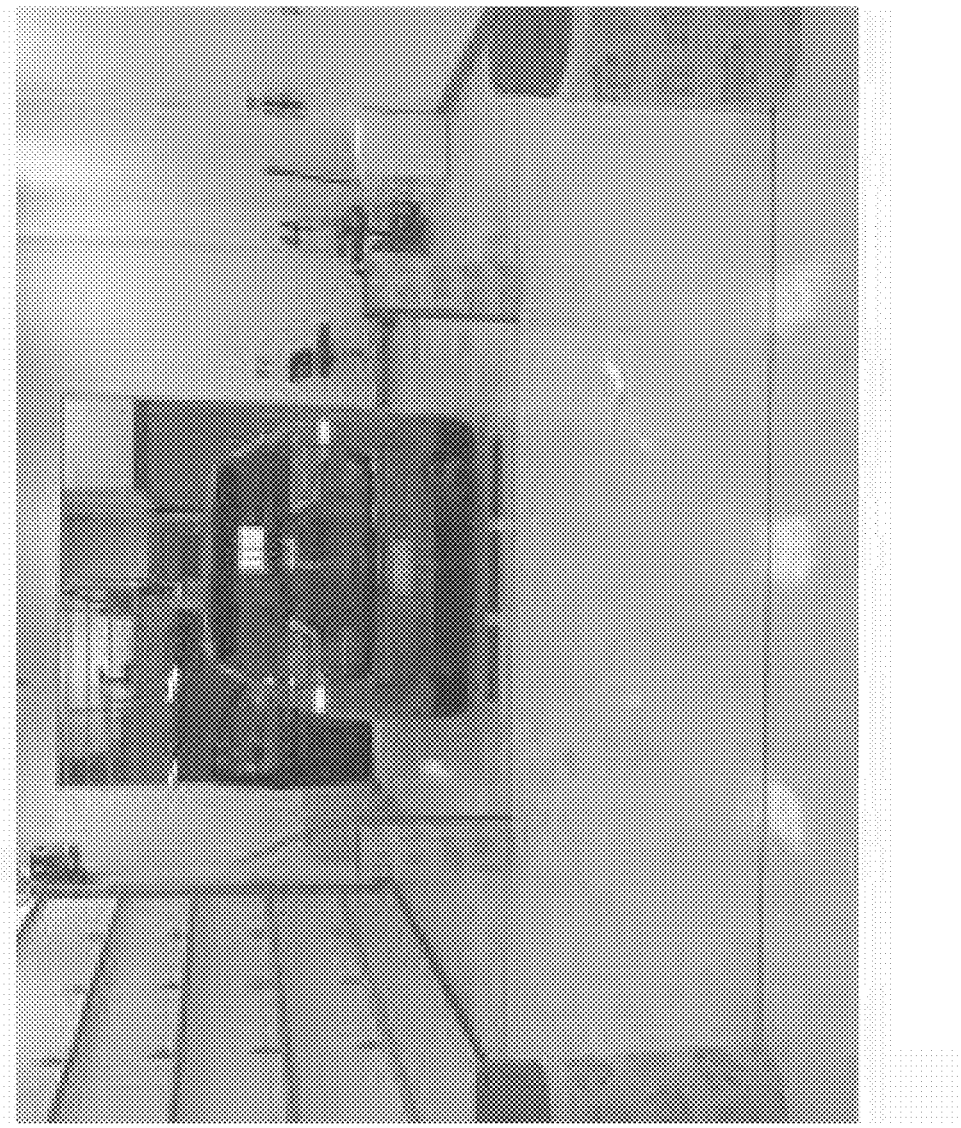
FIG. 6 is a view of the rear of a vehicle with target objects rearward of the vehicle in accordance with the test standards of FIGS. 2-5.
Figure 7:
FIG. 7 is an image as captured by the rearward viewing camera of the vehicle of FIG. 6.
Figure 9:
FIG. 9 is a rearward video image as captured by a rearward viewing camera of a vehicle as displayed on a video screen for viewing by the driver of the vehicle during a reversing maneuver.

As can be seen with reference to FIG. 9, captured video images 22 (as captured by a rearward viewing camera of the vehicle during a reversing maneuver) may be displayed on a video display screen 20 during a reversing maneuver. Because the full dimensions of the video-active region of the video screen used in the video mirror assembly is substantially or fully filled by the rearview image captured by the rear backup camera, and given that such video mirror screens typically have about a 3.5 inches or thereabouts diagonal dimension and have a width to height (as mounted in the interior rearview mirror assembly) aspect ratio typically of likes of about 4:3 or about 16:9, or thereabouts, the image of the likes of targets A, B and C as located and shown in FIG. 5 may be sized large enough on the video display screen to satisfy the regulation standards for a typical distance of the mirror reflective element and video display screen from a typical driver's eyes when the video mirror assembly is normally mounted in the vehicle and when a typical driver is normally operating the vehicle (this distance is about 24 to 28 inches or thereabouts in many vehicles).

However, and as shown in FIG. 10, when some or a substantial amount of the video-active area of video display screen 20 is used for the bird's-eye or panoramic or top-down view or effect 24 to be displayed along with the rearview image captured by the rear backup camera of the equipped vehicle on the same video screen, the video-active display area available for and used for the rearward image display 22' captured by the rear backup camera of the equipped vehicle is correspondingly reduced, and hence the size of the rearward images (as captured by the rear camera) displayed are correspondingly reduced in size. In such a scenario, and of course depending on the size dimensions of the actual video screen used and coupled with its distance in the vehicle cabin from the driver's eyes), the size dimensions of the likes of targets A, B and C of FIG. 5 may fail to meet the NPRM's S6.2.1.2 size requirement that, when the rearview image is measured in accordance with the procedures in S14.1 through S14.2.3 of the NPRM, (a) the calculated visual angle subtended by the horizontal width of the three test objects located at positions A, B and C in FIG. 5 shall average not less than 5 minutes of arc, and (b) the angular size of each individual test object (A, B and C) shall not be less than 3 minutes of arc.

Figure 11:
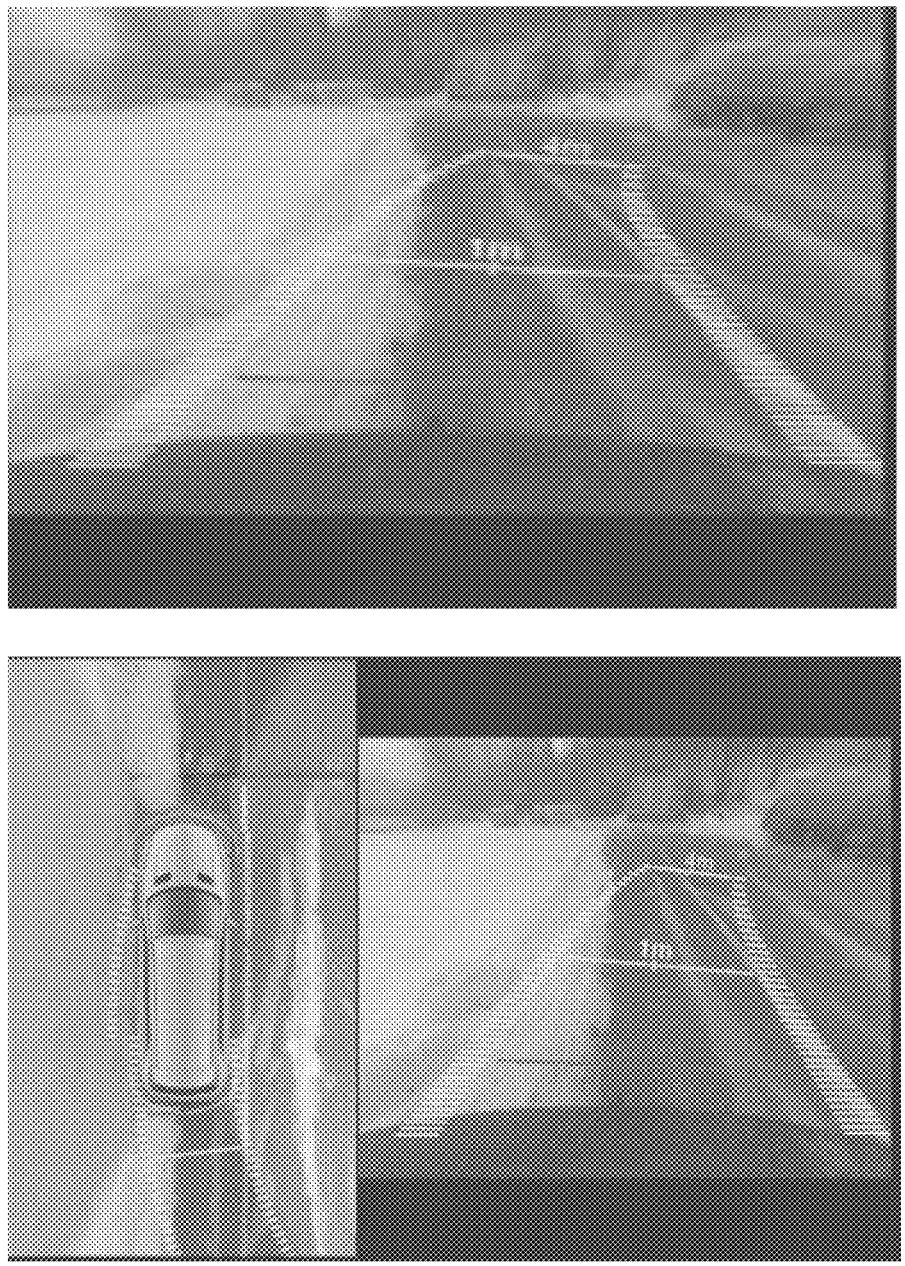
FIG. 11 is a comparison of the size of the rearward video image of FIG. 9 and the reduced size rearward video image of FIG. 10, which is reduced to accommodate the bird's-eye view image at the display screen.

This can readily be seen with reference to FIG. 11, which shows the two display schemes as displayed on an exemplary display. As can be seen in FIG. 11, the displayed rearward image 22 is displayed as a larger image when it is the only image displayed on the display screen, but the displayed rearward image 22' is displayed as a smaller or reduced size image when it is displayed in tandem with the bird's-eye view representation or schematic 24. Thus, the bird's-eye view effectively reduces the effective screen size for displaying rearward images captured by the rear backup camera during a reversing maneuver of the vehicle. Depending on the distance of the mirror assembly and video display screen from the driver's eyes, the reduced size of the rearward image display may result in the displayed rearward images not meeting the size requirements set forth in the proposed Federal Safety Regulations of FIGS. 2-5.

Thus, in such circumstances (where a bird's-eye view is displayed for viewing by the driver of the vehicle on the one screen along with displaying of rearward images captured by the rear backup camera during a reversing maneuver of the vehicle), the bird's-eye view may cause the overall rear backup aid system to run afoul of the minimum size requirements of the displayed images required in the NPRM, such that a larger screen may be required to display the images. Such larger video display screens may be overly costly and may adversely affect the vehicle styling and manufacturer's preferences (since the oversized/larger video display screens may require a larger console space or instrumentation panel space or radio-head space that might be readily/normally available in the equipped vehicle). The present invention resolves such a problem by providing a dual display system that utilizes two separate display screens. One display (typically the larger display) is dedicated, during a reversing maneuver, solely to the composite or synthetic bird's eye or panoramic or top down surround view computer-generated display derived from the multiple video images captured by the multiple set of cameras that constitute the multi-camera surround view system on the equipped vehicle (this display preferably is located at the front console region or at the instrument panel region or in the radio-head region at the front of the interior cabin of the equipped vehicle and is viewable by the driver of the vehicle when reversing, though of course other in-cabin locations can be contemplated). The other separate display (typically the smaller display) solely displays the rearward images captured by the rear backup camera (or rear backup cameras if used) of the equipped vehicle, and preferably, so displays the images full-screen so that the full display area available is filled with the rearward images captured by the rear backup camera(s), and more preferably, with this other display comprising a video screen of an interior rearview video mirror of the equipped vehicle mounted such as at the upper windshield area of the equipped vehicle. The one and the other display are preferably separately located and are distant one from another in the cabin of the equipped vehicle in order to enhance the driver's usage and cognitive appreciation/benefit from the overall system.

Figure 12:
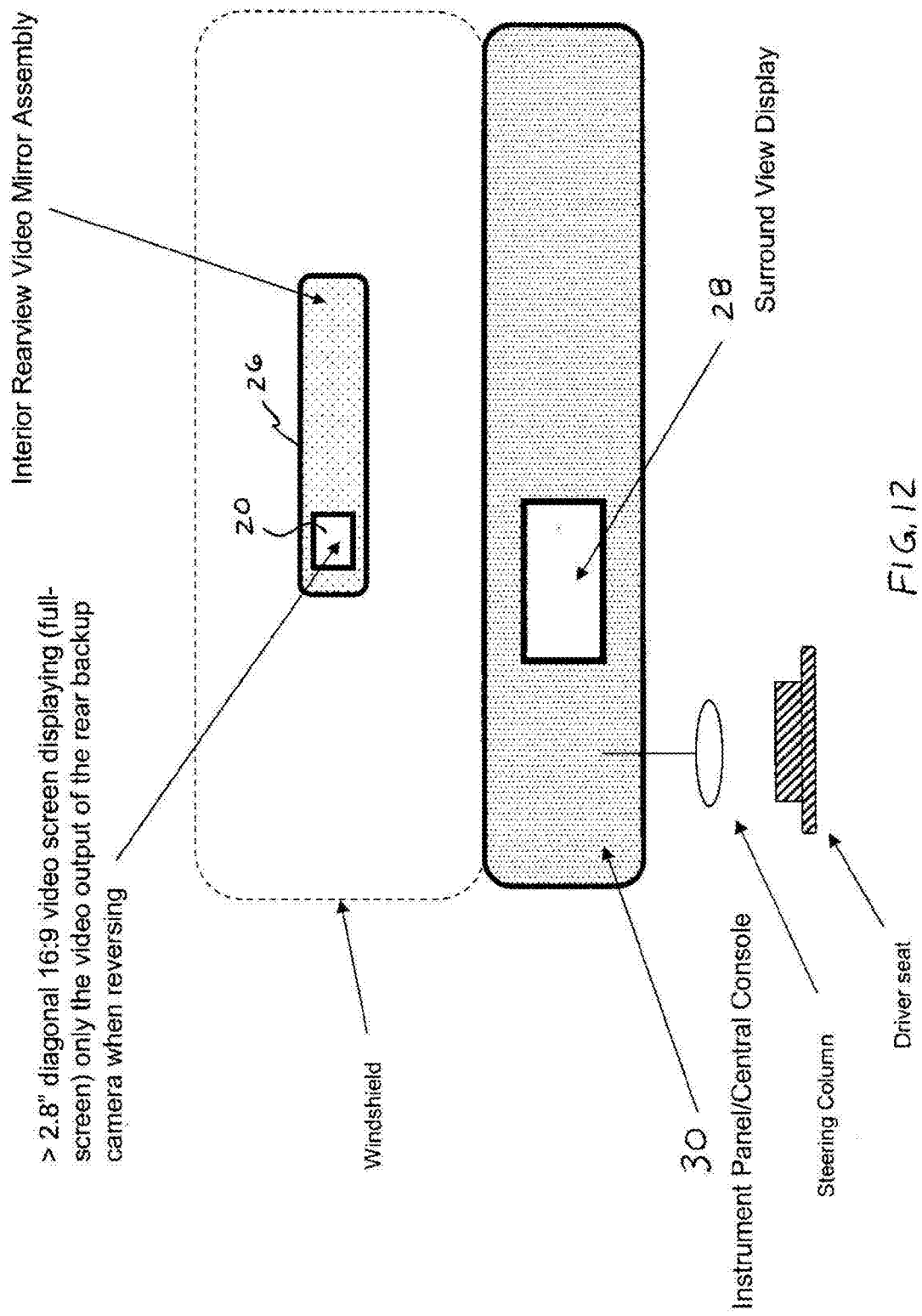
FIG. 12 is a schematic of a vision display system in accordance with the present invention, showing a smaller display screen in an interior rearview mirror assembly for displaying rear backup assist images during a reversing maneuver and a larger display screen at an instrument panel or center console for displaying the surround view or bird's-eye view image.
Figure 13:
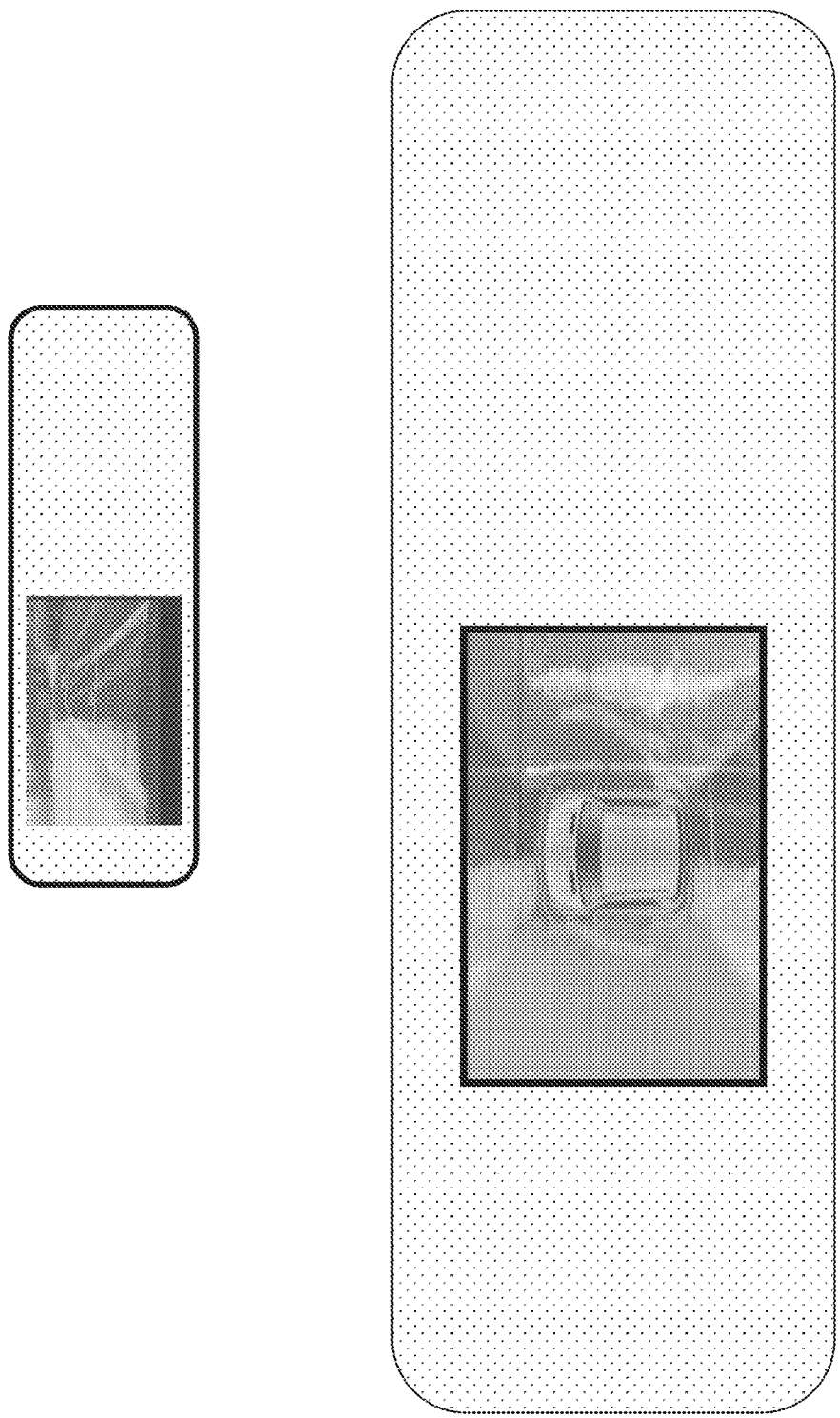
FIG. 13 is a schematic of the vision display system of FIG. 12, showing an exemplary displayed image captured by a rearward viewing camera at the video mirror display and a displayed bird's-eye view representation of the vehicle at a larger display screen at the instrument panel or console of the vehicle.

For example, and as shown in FIGS. 12 and 13, the video mirror 26 may use or house a first display screen 20 (such as a display screen having at least a 2.8 inch diagonal dimension, such as about a 3.5 inch diagonal dimension or larger or smaller depending on the mirror assembly and vehicle application) to display video images captured by the rear backup camera during a reversing maneuver, and a second, larger display screen 28 (such as a 7.8 inch diagonal screen or 8.5 inch diagonal screen or the like) may be located at the instrument panel or center console 30 of the vehicle (and located there to provide a display for likes of a navigation system or infotainment system of the vehicle or to display other information for viewing by the driver of the vehicle) to show the bird's-eye or top-down or panoramic view or effect or representation. Optionally, and alternatively, the larger (particularly further from the driver's eyes, such as in the range of about 30 to 40 inches from the driver's eyes or more or less) console or instrument panel display 28 may be used to show the rear image 22 for a backup assist function, while the bird's eye view 24 may be provided in the video mirror display 20. However, this configuration is less preferred because it is desirable to have the rearward image (captured by the rearward-viewing camera) displayed at the interior rearview mirror assembly during a reversing maneuver, since the driver of a reversing vehicle may typically view the interior rearview mirror assembly (and thus the video mirror display that is displaying the backup assist images) during the reversing maneuver of the vehicle. Advantageously and preferably, and in conjunction with an image processing-based system (such as via use of an EyeQ™ image processor available from MobilEye of Jerusalem, Israel), a machine-vision generated alert may be generated and displayed at the interior rearview mirror assembly (and preferably superimposed upon the displayed rearward image captured by the backup camera) to alert the driver to pay closer attention to what may be rearward of the equipped vehicle during the reversing maneuver, and such as by utilizing aspects of the systems described in International Publication No. WO 2010/099416, published Sep. 2, 2010, which is hereby incorporated herein by reference in its entirety. Optionally, the bird's eye view vision system and display may utilize aspects of the vision systems described in U.S. Pat. Nos. 5,670,935; 6,636,258; 7,145,519; 7,161, 616; 7,230,640; 7,248,283; 7,295,229; 7,301,466 and/or 7,592,928, and/or International Publication No. WO 2010/099416, published Sep. 2, 2010, and/or PCT Application No. PCT/US10/47256, filed Aug. 31, 2010, and/or PCT Application No. PCT/US10/25545, filed Feb. 26, 2010 and published Sep. 2, 2010 as International Publication No. WO 2010/099416, and/or U.S. provisional applications, Ser. No. 61/570,017, filed Dec. 13, 2011; Ser. No. 61/568,791, filed Dec. 9, 2011; Ser. No. 61/559,970, filed Nov. 15, 2011; and/or Ser. No. 61/540,256, filed Sep. 28, 2011, which are hereby incorporated herein by reference in their entireties.

The two-display vision display system of the present invention thus provides enhanced viewing and viewability of rearward captured images from a rear backup camera displayed on the other display (preferably a video mirror display) during a reversing maneuver when a bird's-eye view or representation is also provided and displayed on the separate, distinct, different and distant one display (preferably a console display or an instrument panel display or a radio head display) via a multi-camera surround system (and preferably with the rear backup camera being one of the cameras used in the multi-camera system in the computer-generation of the composite or synthetic views shown on the dedicated one display when the other display is showing, full-screen, the video output of the rear backup camera of the equipped vehicle). The vision display system may operate to display the rearward images at the video mirror display and the bird's-eye or top down or panoramic images/view at the navigation or infotainment screen, and may do so responsive to the driver of the vehicle shifting the vehicle into a reverse gear (such as by utilizing aspects of the vision systems described in U.S. Pat. Nos. 5,550,677; 5,670,935; 6,498, 620; 6,222,447 and/or 5,949,331, and/or PCT Application No. PCT/US2011/056295, filed Oct. 14, 2011 and published Apr. 19, 2012 as International Publication No. WO 2012/051500, which are hereby incorporated herein by reference in their entireties).

By solely during a reversing maneuver providing the rear backup camera images at the video mirror display (without the bird's-eye or top down or panoramic view or effect), the displayed rearward images may encompass the entire video mirror display screen and thus image size of an object as displayed may not be reduced by the inclusion of a bird's-eye or top down or panoramic view feature. The bird's-eye or top down or panoramic view or feature may be solely displayed at the larger navigational screen or infotainment screen or other display screen that is included in the vehicle such as part of a navigational or informational system of the vehicle. The rear backup images captured by the rear backup camera during a reversing maneuver preferably are displayed, full-screen, by the video screen of an interior rearview mirror assembly of the equipped vehicle. The present invention thus may meet the NPRM regulation proposed requirements while providing freedom of design to the vehicle manufacturer.

Optionally, the display system of the present invention may combine three dimensional (3D) image data or images and auxiliary graphical data, preferably such as by utilizing aspects of the systems described in U.S. patent application Ser. No. 13/201,736, filed Feb. 9, 2010 by Newton et al., and published Dec. 15, 2011 as U.S. Publication No. 20110304691, which is hereby incorporated herein by reference in its entirety. The 3D and auxiliary graphical data are combined for rendering on a 3D display, such as by detecting depth values occurring in the 3D image data, and setting auxiliary depth values for the auxiliary graphical data adaptively independent of the detected depth values. Image data captured by individual cameras of a multi-camera system in accordance with the present invention may convey image data to a central electronic control unit of the vehicle via the likes of an Ethernet connection/bus or an LVDS connection/bus.

Note that when a reversing maneuver is not being executed, then the bird's-eye or top down or panoramic view or feature may be displayed at the larger navigational screen or infotainment screen or other display screen in tandem with for example, the forward video view captured by the forward-viewing front camera of the multi-camera surround system. In such a circumstance and when a reverse maneuver is not occurring, the likes of a backlit TFT LCD reconfigurable video mirror screen may not be backlit (and so does not display information) or may display the likes of a compass heading. Of course, during any reversing maneuver, the system of the present invention complies with S6.2.1.3 (Response Time) of the NPRM in that the rearview image from the rear backup camera meeting the requirements of S6.2.1 through 6.2.1.6 as displayed full-screen on the likes of the video screen of an interior rearview video mirror assembly of the equipped vehicle (and with the surround view feature displaying on a separate display such as a larger navigational screen or infotainment screen or other screen) displays the rear backup camera-captured within 2.0 seconds of the time at which the vehicle transmission is shifted into reverse gear. Also, in accordance with S6.2.1.4 (Linger Time) of the NPRM, the rearview image is not displayed by the likes of the video screen of the interior rearview video mirror for more than 10.0 seconds after the vehicle transmission has been shifted out of reverse gear (and such as in accordance with the vision systems described in U.S. patent application Ser. No. 13/285,128, filed Oct. 31, 2011, now U.S. Pat. No. 8,743,203, which is hereby incorporated herein by reference in its entirety). Also, and in accordance with S6.2.1.5 (Deactivation) of the NPRM, the rearview image as captured by the rearview backup camera used in the visual display system of the present invention is not extinguishable by any driver-controlled means, and in accordance with S6.2.1.6 (Display Luminance) of the NPRM, and when tested in accordance with S14.2 of the NPRM, the luminance of the interior visual display used to present the rearview image shall not be less than 500 candelas/square meter.

Thus, to comply with section S6.2.1.5 (Deactivation) of the NPRM that requires that the rearview image shall not be extinguishable by any driver-controlled means, and to comply with section S6.2.1.6 (Display Luminance) of the NPRM requires that, when tested in accordance with S14.2 of the NPRM, the luminance of an interior visual display used to present the rearview image shall not be less than 500 candelas per square meter (in high ambient lighting conditions), the video mirror displays of the present invention, when viewed through the transflective mirror reflector of the preferred video mirror reflective element during the daytime operation in an equipped vehicle, are operable and operate far in excess of a display luminance of 500 candelas per square meter, with display luminance of at least about 1,000 candelas per square meter, more preferably at least about 1,500 candelas per square meter, and more preferably at least about 2,000 candelas per square meter in preferred video mirror assemblies.

However, in the event that the driver engages the reverse gear (with the ignition running) and dwells in reverse for a prolonged period of time (such as for example, greater than at least about two minutes or greater than at least about fifteen minutes or greater than at least about forty minutes or longer), a control of the vehicle (preferably a control associated with and most preferably part of the interior rearview video mirror assembly), sensing that reverse has been engaged for a period longer than a predetermined or threshold prolonged period, progressively and/or in one step reduces via photo sensor control the maximum display luminance from its normal maximum display luminance level to a display luminance level close to but never less than 500 candelas per square meter. Thus, to take an example for illustration, on a sunny day, when ambient lighting at or about the interior rearview video mirror is high (such as, for example, greater than about 100,000 lux or greater than about 250,000 lux), the display luminance of the video mirror display of the present invention may be at around 1,500 candelas per square meter or greater, but if reverse gear is engaged for longer than, for example, three minutes, then the intensity of the backlighting of the video display screen is progressively reduced by a control of the interior rearview video mirror to, for example, around 600 candelas per square meter, but controls to ensure that, at ambient light conditions such as are called out S6.2.1.6 (Display Luminance) of the NPRM, the display luminance is controlled to be at least 500 candelas per square meter and no lower. By so doing, overheating of the interior rearview video mirror is mitigated or reduced or avoided, while preserving and complying with the proposed S6.2.1.6 Display Luminance requirement.

Of course, when ambient light falls or changes or is at a light level below that experienced on a sunny summer day, and preferably when the control is responsive to a photosensor or photosensors located at the interior rearview video mirror assembly itself, the displayed intensity or display luminance can be correspondingly reduced down to a nighttime driving or low ambient lighting condition display luminance of, for example, about 150 candelas per square meter or lower to, for example, a display luminance of around 100 candelas per square meter or even lower. Such reduction in display luminance as the ambient light (such as detected by one or more photo sensors disposed at the mirror assembly) at the interior rearview video mirror assembly decreases can be continuous or, such as via microprocessor control, can be stepped (for example, we find it useful to vary from the highest display luminance to the lowest display luminance in around 100 steps).

Studies have shown that rear backup accidents/incidents can occur at home driveways and/or public parking areas, where the driver enters the vehicle, turns on the ignition of the vehicle, and immediately or fairly immediately (such as within about one to two seconds or thereabouts of starting the engine) commences a reversing maneuver by shifting to a reverse gear of the vehicle and pressing the accelerator. Thus, with a camera-based backup vision system, the desire and need that a driver-appreciable and driver-usable video image be made available for viewing by the driver preferably within about three seconds of initial ignition on/engine startup (i.e., when the driver turns a key or pushes a button to start the vehicle engine), more preferably within about two seconds of initial ignition on/engine startup and most preferably within about one second of initial ignition on/engine startup. Note that while many drivers turn the ignition on simultaneously with starting the engine, initial ignition on can be achieved without turning on the engine, such as by turning the key in a different direction (or turning the key in the same direction but not all the way to the engine start position) without starting the engine and with electrical power provided to components and/or circuitry and/or accessories of the still parked vehicle without starting the engine. Thus, the term "initial ignition on" as used herein encompasses the initial turning on of electricity to otherwise unpowered circuitry and/or components and/or accessories in a parked vehicle when a person, typically the driver of the vehicle, first enters or approaches the vehicle (and can encompass the likes of remote starters or such devices). Because, having initially turned on the engine via the vehicle ignition, the driver may shift the vehicle transmission to reverse (such as by moving the gear actuator to the "R" position) and initiate rearward movement within about three seconds (or within about two seconds or within about one second), it is preferable and desirable that the video images (captured by the rearward facing or rearward viewing backup camera at the rear of the vehicle) be made available for driver viewing within the prescribed time of around 0-3 seconds or thereabouts maximum. Also, although the likes of children are unlikely to be playing in a driveway and the like at very cold temperatures, such as temperatures as low as about −20 or −40 degrees C., it is desirable that the video images be made available within the prescribed time even in such cold weather conditions.

Rear backup systems involve a rear mounted camera (such as a rearward facing or rearward viewing CMOS camera or imager or CCD camera or imager or the like), typically a NTSC camera or other standard protocol camera or a digital camera, and a video display device or unit or module (that typically comprises a video display screen, most commonly a backlit reconfigurable liquid crystal display screen, and associated circuitry including video decoders and other associated video display circuitry and/or the like). Upon initial ignition on of the vehicle and initial electrical powering of the components of the display system, there can be a time delay for components/circuitry during which the component/circuitry is activated and warms up before it is functioning in its normal manner. Also, time may be needed to upload algorithms/logic from the likes of ROM/memory during this initial initiation period. For example, and with reference to FIG. 15, almost immediately (within about 150 milliseconds) upon ignition on (i.e., typically when the driver turns on the engine), electricity is at least provided to the rear camera and the video display device, and such rear cameras can typically take from around about 500 milliseconds to around 1.5 seconds (shown in FIG. 15 as about 800 milliseconds following ignition on) to be ready to provide a valid video signal as an output on a video cable or other link to the video display screen (typically at the interior rearview mirror of the vehicle or at the instrument panel or an overhead console of the vehicle). Thus, initiation or boot-up of the video display device can be and preferably is initiated and electricity is supplied thereto immediately upon initial ignition on, and preferably initiation or boot-up of the rearward viewing camera can be and preferably is initiated and electricity is supplied thereto immediately upon initial ignition on. Thus, preferably, initiation/boot-up of the video display device can occur simultaneously with and in parallel with the initiation/boot-up of the rearward viewing camera and such initiation/boot-up does not occur serially or partially serially.

Figure 15:
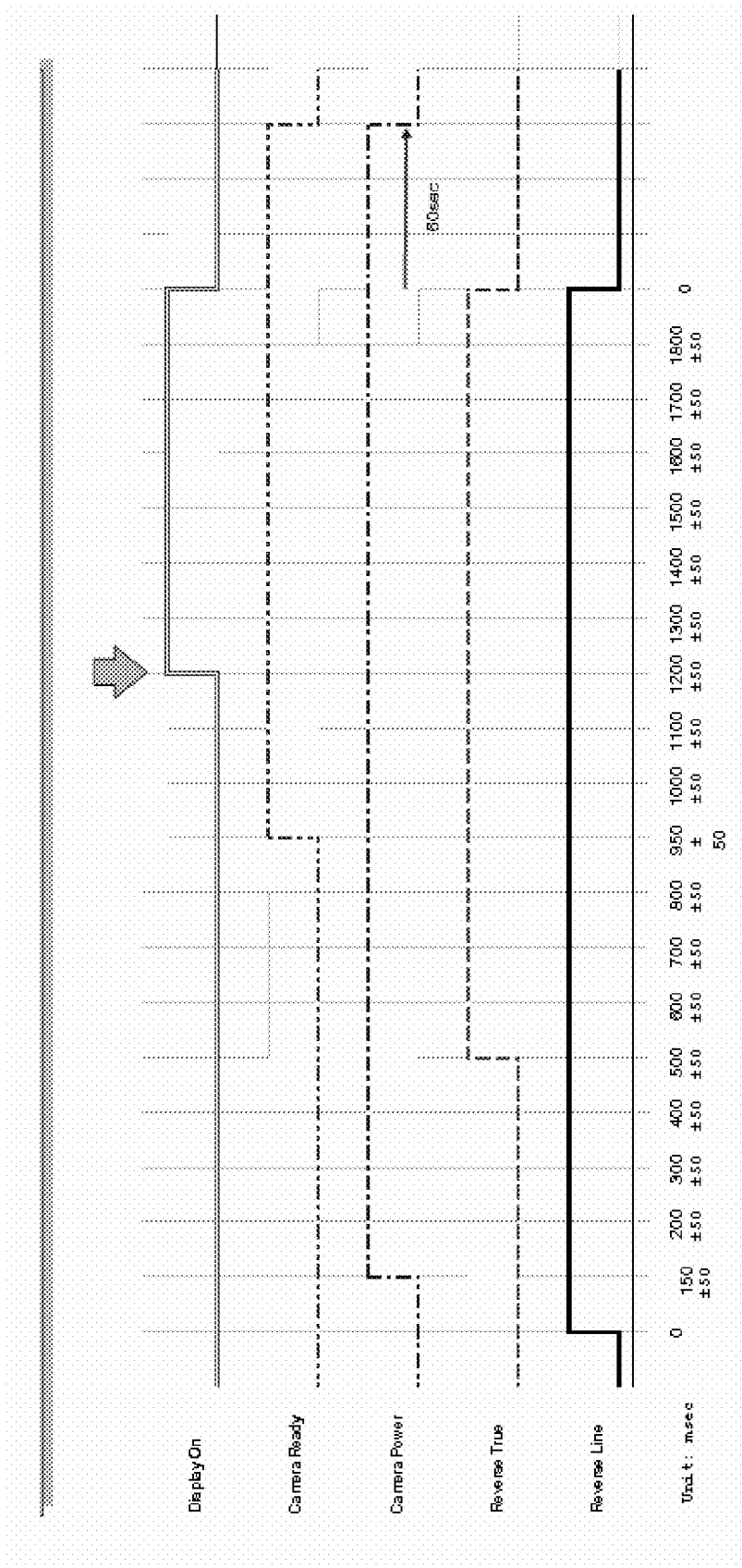
FIG. 15 is a graph of the times for starting components of a video display system following a trigger event, in accordance with the present invention.

Video display screens of such video display devices are typically liquid crystal video displays that, particularly at low temperatures, such as below about −20 degrees C. or thereabouts, may be sluggish to operate, so that the video display device is not initially responsive enough or fast enough to keep up with the image frame rate provided by the camera device. In other words, the driver may not see a proper or quality or usable video image of the rear blind zone being viewed by the rearward viewing camera during its initial/initiating period. Also, the video display device or module typically includes the likes of video encoders/decoders and other ancillary circuitry, microprocessors, backlighting (such as an array of light emitting diodes or the like) and/or the like, which may require and may consume some time to activate and boot-up before they operate in their normal or full operating state/mode. As shown in FIG. 15, the vision or display system of the present invention may delay turning on the backlight of a backlit liquid crystal video display screen of a video display device for a period of time (such as, for example, about 1.2 seconds or thereabouts) following the ignition on/engine startup event so that the video display will be assuredly ready to display the video images captured by the rearward viewing camera (but this delay may be longer and may be as long as about 1.5 seconds or thereabouts, depending on when a camera ready or "valid" signal state is achieved by the display system). Thus, an OEM can choose from a variety of rear cameras, some of which may be faster to initiate than others, with confidence that as long as initiation/boot-up by the selected camera is no longer than the prescribed time period (for example around 1.2 seconds or thereabouts), the driver will not view poor quality/inadequate video images during the initiation period.

The vehicle and its controls, including any controls or circuitry at the camera or video display unit or device or module, are capable of distinguishing a first ignition condition (when the driver of the vehicle first turns the key or pushes a button or the like to start the vehicle's engine) and thus the camera and/or the video module can be controlled to operate different in such a first ignition condition than in subsequent conditions or times during the driving period following the first ignition of the vehicle.

Thus, at the exact instant or thereabouts that a "first ignition" is detected, the display system preferably simultaneously and in parallel activates/initiates and boots-up the rearward viewing backup camera and the video mirror display device. The display system of the present invention preferably processes signals to determine the earliest valid video signal from the rearward viewing camera and the microsecond (or at least substantially quickly or substantially simultaneously) that the valid video signal is determined, the system activates the video display device to turn on the likes of backlighting of the video screen to display images at the video display screen. It may be undesirable to activate the video display unit until such valid video images are determined and available, because if the video screen is on while no video images are received from the camera, the display may appear to the driver of the vehicle as not functioning properly. Thus, the present invention operates to turn on the video display device quickly and almost immediately following the first ignition, but delays operating the video display device to backlight the video screen preferably until valid video images are available for display, such that the video display device is operated to display images only when (and substantially simultaneously to when) valid video images are received from the rearward viewing camera. For example, and as shown in FIG. 15, the system may delay activating the backlighting of the video display device or unit or module for about 1.2 seconds following the initial ignition on or triggering event, and may delay this further if no valid video signal is received by that time from the rearward viewing video camera.

Optionally, when commencing a reversing maneuver, the vehicle display may provide an alert or warning at the display screen (such as "Check Behind the Vehicle Before Backing Up" or the like). Such warnings are typically provided when the vehicle transmission is initially shifted into reverse gear. It is envisioned that such warnings or alerts should only be provided during the brief initiation period and quickly removed or canceled as soon as the rearward images are available for viewing at the display device.

Also, video display devices or units or modules may have and typically do have at least one and often two thermal sensors or thermistors on board. Thus, the video display devices or units or modules are capable of sensing the ambient environment in which they are disposed. Thus, if very cold temperatures are sensed (such as, for example, about −40 degrees C.), the display system may optionally operate or function to enhance or speed up the operation of the video display device (such as via a higher energy boost at startup or via heating of the video display prior to activation or the like).

Optionally, and with reference to FIG. 16, an interior rearview mirror system may comprise a video mirror with a video display device operable to display video images during a reversing maneuver in accordance with the present invention. The mirror assembly may include a rearward facing or rearward viewing sensor for sensing light through the mirror reflective element for video display dimming functions and electrochromic mirror dimming functions. The mirror system includes circuitry and thermal algorithms for providing enhanced or fail safe liquid crystal display module operation. Optionally, the mirror system may include electrochromic exterior mirror assemblies and an electrochromic interior mirror assembly.

The rearward viewing camera may be powered via any suitable power supply at the vehicle. For example, the camera power may be provided from the video mirror itself (such as at about 6.6 volts nominal and at about 200 mA maximum).

Optionally, the mirror assembly may include a user input or switch that enables and/or disables the EC dimming function and the video display function. The mirror button or user input function may, when the ignition is on, control the EC dimming function (on/off) when the vehicle is not in reverse and control the video display function (on/off) when the vehicle is in reverse and during a reversing maneuver.

Optionally, the mirror assembly may include an EC/video indicator (such as a light emitting diode or the like), which functions to indicate to the driver of the vehicle the status of the EC dimming function and/or the video display function. Optionally, the indicator may operate at full intensity only during daytime lighting conditions and may operate at a reduced intensity in lower lighting conditions, such as nighttime lighting conditions or the like. The indicator may be activated when the EC dimming function is on and deactivated when the EC dimming function is off, and optionally the indicator may flash to indicate that the video display is activated or deactivated (such as when the video display is deactivated during a reversing maneuver of the vehicle).

During operation of the display system, and responsive to the driver of the vehicle shifting the vehicle into reverse, the display system of the present invention may activate or power the rearward viewing camera within about 100 milliseconds to about 200 milliseconds following the shifting into reverse. The rearward viewing camera may be powered throughout the reversing maneuver and optionally may be un-powered about 60 seconds after the driver of the vehicle shifts the vehicle out of reverse (after completion of the reversing maneuver), so that the camera power stays on for a period of time after shifting out of reverse so as to provide for a quicker response time if the vehicle is again shifted into reverse (such as when the driver of the vehicle may shift in and out of reverse multiple times, such as for the likes of parallel parking). Optionally, the video display unit or module may be enabled at each new ignition cycle, and the state of the video display may be remembered after completion of a reversing maneuver or cycle (for example, if the video display unit is turned on or off, it will remain in its selected state (on or off) until the user input or button is actuated again in a reversing cycle or ignition cycle).

Stop and go operation of vehicles is currently gaining favor for reasons of fuel economy and the like. In a "stop and go" vehicle, the engine turns off whenever the vehicle stops, such as at a traffic light or in traffic or the like, and when, for example, in a manual transmission vehicle, the driver shifts into neutral and the vehicle is stationary, the engine turns off and then restarts again when the driver presses the clutch. However, electrical power is maintained to the components and accessories of the vehicle during these stop and go periods and, thus, the stopping and then restarting of the vehicle will not result in the above prescribed delay in displaying video images due to the activation and boot-up time period of the video display device and rear backup camera. For such vehicles, it is envisioned that the display system of the present invention may recognize when the engine stop occurs due to traffic stops or the like (where the key is not turned to an "off" position) and the camera may be powered during such stopped periods to provide for a quicker response time when the vehicle engine is restarted and if the vehicle is shifted into reverse at the time of or immediately following engine restart.

Optionally, and desirably, the video display may function to display a stable and valid video image (if the signal from the rearward viewing camera is stable and valid at that time) within between about 500 milliseconds and about 1.5 seconds after the driver shifts the vehicle into the reverse gear. Optionally, but less preferably, the video display may function to display a stable and valid video image (if the signal from the rearward viewing camera is stable and valid at that time) within between about 900 milliseconds and about 2 seconds after the driver shifts the vehicle into the reverse gear, and less preferably within between about 1.5 seconds and about 3 seconds after the driver shifts the vehicle into the reverse gear. The video display device or unit or module may detect (and turn off the display with no flicker) when the video signal is broken, such as when the video plus and/or video minus wire is disconnected. The video display device or unit or module may shut off or deactivate immediately after the reverse signal is removed, or optionally, a delay feature may be provided or selected.

The indicator (such as a light emitting diode or the like) may be operable to indicate to the driver the status of the EC dimming function and/or the video display function. For example, the indicator may be activated when the EC dimming function is activated to indicate to the driver that the EC dimming function is working, and the indicator may flash or otherwise alert the driver that the video display is deactivated during a reversing maneuver (or may provide other alerts to the driver regarding the status of the video display). Optionally, for example, when the vehicle is in reverse and there are no video images provided by, for example, about 1.5 seconds, the display system may operate to deactivate the video display backlight and may flash or blink the indicator (such as at 1 Hz or any suitable rate of flash) or vary the intensity or color of the indicator to indicate to the driver that no video images are available. Optionally, and desirable, the system may enable the video display and display video images immediately when a good camera video signal becomes available or present while the indicator is flashing and while the vehicle is in reverse. The video mirror display illumination may provide illumination at any suitable intensity, such as about 1,500 cd/m$^2$ or more, as viewed through a transflective mirror reflector of a transflective mirror reflective element, such as by utilizing aspects of the display devices and mirror assemblies described in U.S. Pat. No. 7,855,755, which is hereby incorporated herein by reference in its entirety.

Optionally, the display system of the present invention may delay or lockout user selectable display options or features during an initial reversing maneuver or the like. For example, some vehicles may provide a video zoom feature for use when reversing a vehicle towards a trailer so that the driver can more readily align the trailer hitch of the vehicle with the tongue of the trailer. When video zoom is selected, the rearward viewing camera and/or the video display device zooms and/or focuses and/or crops the field of view or displayed images to show the region immediately behind the vehicle where the ball of the trailer hitch of the vehicle is located, so that the driver can view the ball in the displayed images and thus see the tongue of the trailer in the displayed video images as the vehicle approaches the trailer. Thus, with a tow check function, the rear backup camera changes its view from its normally broad blind zone view to a narrow or focused or zoomed view immediately rearward of the vehicle. Such a tow check function may be selectively actuated by the driver, such as via actuation of a user input, such as a button or switch or the like, immediately prior to or during a reversing maneuver.

Such a "tow check" event is a relatively infrequent event and when occurring, the driver is aware that a tow check should be made and/or is being made and can selectively activate that feature, such as via a user input or button or the like that causes display of the zoomed in view at the video display screen. Optionally, the display system of the present invention may delay activation of such a tow check feature or view until after a period of time following the driver shifting into a reverse gear. For example, the system may prevent shifting into reverse gear and switching to a tow check or zoomed view at the same time, but may allow for first shifting into reverse gear and then delaying switching to the tow check or zoomed view for a threshold or minimum period of time. Thus, for example, a driver may shift the vehicle transmission into reverse gear and may actuate or select the tow check view option (such as via actuating a user input or button or the like) while in reverse gear, but the system will operate to display the normal backup assist view for a minimum time period, such as at least about 3-5 seconds, maybe about 5-10 seconds or more or less, and will not switch to the tow check view or display during that time period, and only after the delay time period has elapsed will the system switch to the selected tow check or zoomed view. When the driver shifts the vehicle out of reverse gear, the tow check view may remain available, with no delay applied if the vehicle is again shifted back into reverse gear (to allow for a driver to make multiple attempts to align the trailer hitch of the vehicle with the tongue of the trailer via shifting the vehicle transmission in and out of reverse gear multiple times). After the vehicle is shifted out of reverse and into a forward gear and the vehicle is driven forwardly (such as for a threshold distance or to or at a threshold speed) or after the vehicle ignition is turned off, the system may be reset so that the delay period is applied for subsequent shifting into reverse gear.

Thus, when a driver initially starts the vehicle and shifts into reverse gear, even if the driver selects or actuates the zoom function at or around the same time as shifting into the reverse gear, the display device will maintain display of the full view or uncropped view of the camera's rearward field of view (typically at least about 130 degrees or at least about 145 degrees or more and up to or greater than around 180 degrees at the rear of the vehicle) for a predetermined period of time during which the displayed field of view cannot be manually or mechanically changed by the driver of the vehicle. Such a delay period (during which the driver cannot override the "normal" or uncropped display of the rearward field of view of the camera) may be a period of time of up to several seconds, such as up to about 5 seconds or more and preferably not more than 10 seconds, depending on the particular application of the display system. Thus, during the delay period, the driver cannot override display of a reasonable field of view rearward of the vehicle during onset of a reversing maneuver. Even if the driver selects the zoom function during the delay period, no change will occur with the displayed images, but upon completion of the delay period, the display device will display the selected zoomed images or cropped images or the like to assist the driver in aligning the vehicle with a trailer.

Optionally, the display system of the present invention may control or delay operation of a navigation display device or feature immediately after initial engine on and at least initially during a reversing maneuver of the vehicle. Vehicle manufacturers and safety advocates advocate that a navigation system or display should only be programmed by the user when the vehicle is not moving. Such a navigation system and navigation display screen may take up to about 6-10 seconds to initialize. The display system of the present invention may, upon detection of a shifting of the vehicle to reverse gear, give priority to displaying the reversing scene (and delay initialization of the navigation screen for a period of time during which the backup camera images are displayed). Thus, the system overrides the initialization of the navigation display screen and gives priority to display of the backup camera images and thus displays the backup camera video images as quickly as possible at the video display device. After the backup images are being displayed, the initiation of the navigation display device may commence.

Figure 14:
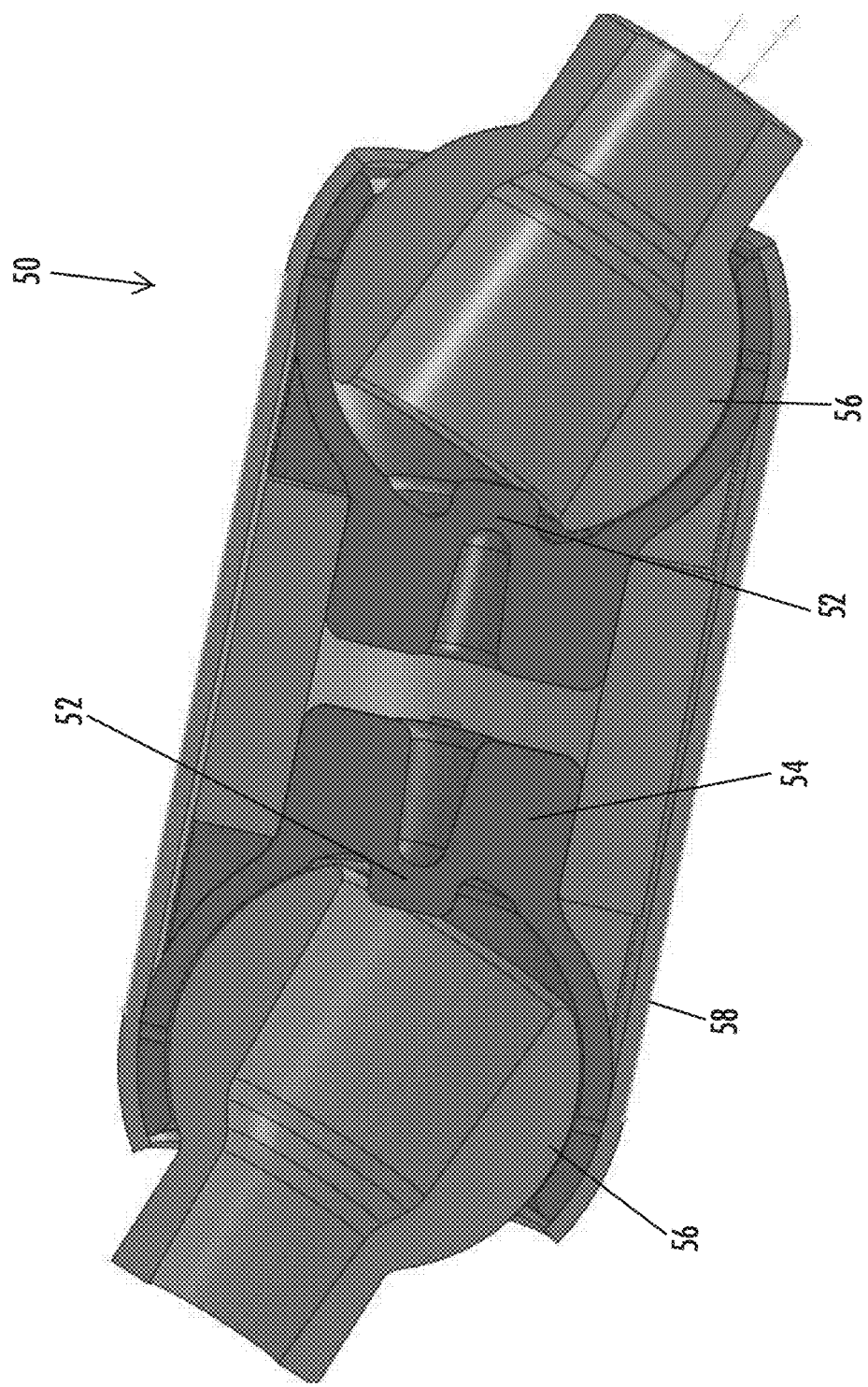
FIG. 14 is a sectional view of a double ball mounting arrangement suitable for mounting an interior rearview video mirror assembly of the present invention at an in-cabin surface of a windshield of the equipped vehicle.

An interior rearview mirror assembly, such as an interior rearview video mirror assembly that incorporates a video display screen as discussed above, may be mounted at an in-cabin surface of a windshield of the vehicle via any suitable mounting arrangement, such as, for example, a single ball mounting arrangement or a double ball mounting arrangement or the like. Optionally, the mounting arrangement may comprise a double ball configuration of the type shown in FIG. 14. The mounting arrangement 50 comprises a "medium ball" bracket having about an eighteen mm ball diameter, and includes an anti-camout integrated cup design. The nubs 52 on the inside of the cups 54 function to bottom-out on the balls or ball members 56 (such as at the inner walls of passageways through the ball members) at maximum travel or maximum pivoting of the balls at the mounting arm. Optionally, the mounting arrangement may have wireways or passageways for routing wires (such as for powering and/or controlling the video screen and/or electrochromic circuitry and/or the like) through the cups, spring and tube 58.

The interior rearview mirror assembly of the present invention may be mounted at the vehicle via any suitable mounting assembly attached to an interior portion of the vehicle, such as to an in-cabin surface of a vehicle windshield (such as to a mounting button or attachment element adhered to the interior surface of the vehicle windshield). The mirror assembly may be mounted at or attached to an interior portion of the vehicle (such as to a mounting button or the like at an interior surface of the vehicle windshield or the like) via any mounting means, such as a single ball or single pivot mounting arrangement, or a double ball or double pivot mirror mounting arrangement. Examples of double pivot or double ball mounting arrangements are described in U.S. Pat. Nos. 4,646,210 and 6,331,066, which are hereby incorporated herein by reference in their entireties. The mounting assembly may be mounted to a mounting button or attachment element at the vehicle windshield via a breakaway mounting construction, such as by utilizing aspects of the mounting constructions described in U.S. Pat. Nos. 6,774,810; 6,642,851; 6,483,438; 6,366,213; 6,326,900; 6,222,460; 6,172,613; 6,087,953; 5,820,097; 5,377,949; 5,330,149 and/or 5,100,095, which are hereby incorporated herein by reference in their entireties. The mounting assembly may utilize aspects of the mounting assemblies described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, and/or U.S. patent application Ser. No. 11/226,628, filed Sep. 14, 2005 and published Mar. 23, 2006 as U.S. Publication No. US-2006-0061008; and/or Ser. No. 12/912,253, filed Oct. 26, 2010, now U.S. Pat. No. 8,851,690, and/or International Publication No. WO 2010/111173, published Sep. 30, 2010, which are hereby incorporated herein by reference in their entireties). Optionally, the mirror assembly may incorporate a mounting arrangement of the types described in U.S. Pat. Nos. 7,289,037; 7,249,860 and/or 7,448,589, and/or U.S. patent application Ser. No. 10/522,446, filed Jan. 19, 2005 and published Nov. 10, 2005 as U.S. Patent Publication No. 2005-0248168, which are hereby incorporated herein by reference in their entireties.

The video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety). The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties.

Optionally, the video mirror display may be disposed rearward of and behind the reflective element assembly and may comprise a display such as the types disclosed in U.S. Pat. Nos. 7,855,755; 5,530,240; 6,329,925; 7,626,749; 7,581,859; 7,338,177; 7,274,501; 7,255,451; 7,195,381; 7,184,190; 5,668,663; 5,724,187 and/or 6,690,268, and/or in U.S. patent application Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

The display or displays may comprise a video display and may utilize aspects of the video display devices or modules described in U.S. Pat. Nos. 7,855,755; 6,690,268; 7,184,190; 7,274,501; 7,370,983 and/or 7,446,650, and/or U.S. patent application Ser. No. 10/538,724, filed Jun. 13, 2005 and published Mar. 9, 2006 as U.S. Publication No. US-2006-0050018, which are all hereby incorporated herein by reference in their entireties. The video display may be operable to display images captured by one or more imaging sensors or cameras at the vehicle. The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010, and/or U.S. patent application Ser. No. 12/508,840, filed Jul. 24, 2009, and published Jan. 28, 2010 as U.S. Pat. Publication No. US 2010-0020170, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093;

5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336), and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

For rear backup assist systems, various types of cameras and/or video displays may be utilized. Typically, rear backup cameras comprise color video cameras and the video display device displays color video images for viewing by the driver of the vehicle. Such color cameras comprise RGB filters (or other color filtering means), and may use a separate near infrared filter, to cause the camera to capture color images, while reducing blooming/pixel saturation due to near infrared radiation from ambient lighting and/or from the rear backup lighting of the vehicle and/or other lights present and operated when the reverse gear of the vehicle is selected. Also, the color filter and especially any near infrared filtering provided for a color rear video camera substantially impacts and reduces the camera's low level light sensitivity. This is especially so for CMOS cameras, such as described in U.S. Pat. Nos. 5,550,677; 5,877,897 and/or 5,796,094, which are hereby incorporated herein by reference in their entireties.

By dispensing with the color and near infrared filters at the camera, the full near infrared sensitivity of the CMOS imager or photosensor array may be harnessed/utilized. Thus, the camera may view or see in the near infrared range (typically light or energy that has a wavelength between about 750 nm and about 2,500 nm or thereabouts). For example, an imager comprising an array of photosensors formed by complementary-metal-oxide-semiconductor (CMOS) technology on a semiconductor substrate can have sensitivity to near infrared radiation out to around about 1,200 nm or thereabouts. This is especially beneficial because when the reversing light comes on, such lights are rich in visible light and also in near infrared light or energy, so by not including the color and near infrared filters at the camera, the performance of the camera is substantially enhanced in such low ambient lighting conditions. Such a camera not only provides enhanced performance in lower ambient lighting conditions, but does so with a reduced cost camera.

Also, in the likes of commercially available video mirrors supplied for vehicles today, the LCD video screen of the video display device used has RGB filters or color mosaic pattern filters associated with the likes of individually addressable pixels of the multi-pixel/reconfigurable liquid crystal display screen, and with the screen backlit by a plurality of light emitting light sources (such as white light emitting light emitting diodes or the like) operable, when powered, to generate a backlighting intensity to the rear of the video screen employed of at least about 30,000 candelas/m$^2$ (such as by utilizing aspects of the display systems described in U.S. Pat. No. 7,855,755, which is hereby incorporated herein by reference in its entirety) so as to provide a display intensity of video images and other information displayed to and viewed by the driver of the vehicle through the transflective mirror reflector of the likes of an electrochromic interior rearview mirror reflective element utilized of at least about 400 cd/m$^2$ as viewed by the driver normally operating the vehicle equipped with the display system. Thus, the provision of color video display for viewing by the driver of the vehicle comes at the price of lower light transmission for backlighting through the color mask or filter of the display screen and, thus, requires a high level of backlighting intensity to provide the desired display intensity for all viewing conditions, including higher ambient lighting conditions, such as a sunny day, and such a high level of backlighting intensity is especially required or desired when the video screen is viewed through a transflective reflector of a video mirror assembly, such as described in U.S. Pat. Nos. 6,690,268; 7,184,190; 7,274,501; 7,370,983; 7,446,650 and/or 7,855,755, which are hereby incorporated herein by reference in their entireties. Thus, the provision of color video display adds cost and complexity to the vision system, and requires powerful backlighting and color filtering (and optionally near infrared filtering and the like).

For a color video display screen, the color filter or mask at the display screen attenuates or reduces light transmission through the display screen by a factor of between about two and three or thereabouts (and could reduce transmission by more or less depending on the particular application), and thus the color filters or masks reduce the backlighting that passes through the display screen for viewing by the driver of the vehicle. Thus, with the color filter or mask removed, the display device may provide comparable display intensity with only about one-half as many to about two-thirds as many backlighting light emitting diodes, and/or the backlighting light emitting diodes may individually operate at a lower intensity and/or electrical current. Thus, the un-filtered display screen may operate with a reduced number of backlighting light emitting diodes or at a reduced intensity, which results in reduced power consumption by the powered backlighting light emitting diodes and reduced heat generated by the powered backlighting light emitting diodes, which achieves a reduction in the cost to manufacture and operate the display screen.

Optionally, a video display system of the present invention may utilize a monochromatic camera and video display to provide a reduced cost video display system for a vehicle. For example, and with reference to FIG. 17, a video display video display system 120 may comprise a monochromatic video camera 122 and a monochromatic video display 124 (such as a video mirror display screen incorporated in an interior rearview mirror assembly 126 or the like). As shown in FIG. 17, the camera 122 comprises a rearward facing or rearward viewing camera disposed at a rear exterior portion of the vehicle 128, and the camera captures images of the rearward scene and communicates an output signal to the video display 124 (such as via a wired link or a wireless link or a network bus of the vehicle or the like). The video camera may comprise a CMOS camera (and associated circuitry) with no color filtering (for example, with no RGB filtering or mosaic color filtering or Bayer pattern filtering or the like) at the photosensing pixels of the camera. Optionally, the video camera may comprise photosensing pixels that are sensitive to infrared or near infrared light (such as by utilizing aspects of the video cameras described in U.S. Pat. Nos. 5,550,677; 5,877,897 and/or 5,796,094, which are hereby incorporated herein by reference in their entireties), and the video camera may not include any near infrared filter or the like. Thus, the rearward viewing camera may provide enhanced sensitivity at lower lighting conditions, without the concern of an adverse affect on the color or tint of the captured images.

The video display unit or module 124 includes a video display screen, such as a backlit liquid crystal display screen, and a plurality of backlighting light emitting diodes. Because the video display screen does not include the color filtering of known color video display screens, the backlighting may provide a reduced backlighting intensity, such as a backlighting intensity of no more than about 25,000 cd/m$^2$ or thereabouts, and preferably greater than about 10,000 cd/m$^2$ or thereabouts. With a monochromatic CMOS camera combined with a monochromatic video display, and with a video mirror construction of either prismatic type or electrochromic type (such as described in U.S. Pat. Nos. 6,690,268; 7,184,190; 7,274,501 and/or 7,855,755, which are hereby incorporated herein by reference in their entireties), where a transflective interior mirror reflective element is utilized, it is found that a backlighting intensity of no more than about 25,000 cd/m$^2$ or thereabouts, and preferably greater than about 10,000 cd/m$^2$ or thereabouts, provides a driver-viewed display intensity of at least about 400 cd/m$^2$ as displayed through the transflective mirror reflector in a display on demand display configuration and as viewed by the driver normally operating the vehicle. It is found that dispensing with color filters at both the display screen and the rear backup camera, allied with the dispensing/non-utilization of near infrared filtering at the rear backup camera, results in video display of monochrome images in an economical and affordable manner, and with the monochrome images readily usable and appreciable by a driver executing a reversing maneuver, and with the monochrome video images in compliance with the Notice of Proposed new Rule Making (NPRM) issued by the Department of Transportation, National Highway Traffic Safety Administration (NHTSA) and discussed and incorporated by reference above and with the caption of the NPRM shown in FIG. 2 and aspects of the proposed Final Rule summarized/captured in FIGS. 3-5.

Although preferable to use a plurality of white light emitting LEDs to backlight a thin film transistor reconfigurable video display screen in the likes of an interior video mirror assembly, a plurality of similarly colored LEDs may optionally be used. For example, a plurality of red or amber LEDs may be utilized for backlighting a monochromatic video screen, whereupon the monochrome images displayed and seen are respectively tinted. Such tinted monochrome video displays may be more affordable given that individual red light emitting or amber light emitting LEDs can cost less than corresponding white light emitting LEDs.

Thus, the combination of a monochromatic video mirror screen and a monochromatic rearward viewing camera provides enhanced image capture and image display properties, such as at lower lighting conditions, and can do so at reduced cost and complexity of the display system. The CMOS photosensor array or camera with no color filter (unfiltered) operates to capture unattenuated light (with no color filter and no near IR filter or the like), and the sensitivity of such cameras provide enhanced sensitivity in the infrared range and near infrared range of the electromagnetic spectrum. The monochromatic CMOS camera is in communication with a video screen that also has no color filters. Thus, the camera is more sensitive at lower lighting levels and the display screen can operate at lower backlighting intensities, while still providing the desired or appropriate display intensity for viewing by the driver of the vehicle. Thus, the driver can readily view and appreciate the displayed image and the displayed image may provide enhanced contrast to ease the viewability and discernibility of the displayed images.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, and/or U.S. provisional applications, Ser. No. 61/570,017, filed Dec. 13, 2011; Ser. No. 61/568,791, filed Dec. 9, 2011; Ser. No. 61/567,446, filed Dec. 6, 2011; Ser. No. 61/567,150, filed Dec. 6, 2011; Ser. No. 61/565,713, filed Dec. 1, 2011; Ser. No. 61/563,965, filed Nov. 28, 2011; Ser. No. 61/559,970, filed Nov. 15, 2011; Ser. No. 61/556,556, filed Nov. 7, 2011; Ser. No. 61/554,663, filed Nov. 2, 2011; Ser. No. 61/550,664, filed Oct. 24, 2011; Ser. No. 61/552,167, filed Oct. 27, 2011; Ser. No. 61/548,902, filed Oct. 19, 2011; Ser. No. 61/540,256, filed Sep. 28, 2011; Ser. No. 61/539,049, filed Sep. 26, 2011; Ser. No. 61/537,279, filed Sep. 21, 2011; Ser. No. 61/513,745, filed Aug. 1, 2011; Ser. No. 61/511,738, filed Jul. 26, 2011; Ser. No. 61/503,098, filed Jun. 30, 2011, which are all hereby incorporated herein by reference in their entireties, a trailer hitching aid or tow check system, such as the type disclosed in U.S. Pat. No. 7,005,974 and/or U.S. provisional applications, Ser. No. 61/496,090, filed Jun. 13, 2011, and/or Ser. No. 61/436,397, filed Jan. 26, 2011, which are hereby incorporated herein by reference in their entireties, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149, and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009 and published Apr. 22, 2010 as U.S.

Publication No. US-2010-0097469, which are hereby incorporated herein by reference in their entireties.

Optionally, the mirror assembly may include user inputs that may comprise buttons or switches for controlling or activating/deactivating one or more electrical accessories or devices of or associated with the mirror assembly. The mirror assembly may comprise any type of switches or buttons, such as touch or proximity sensing switches, such as touch or proximity switches of the types described above, or the inputs may comprise other types of buttons or switches, such as those described in U.S. Pat. Nos. 6,001, 486; 6,310,611; 6,320,282; 6,627,918; 6,690,268; 7,224, 324; 7,249,860; 7,253,723; 7,255,451; 7,360,932 and/or 7,446,924, and/or U.S. patent application Ser. No. 10/538, 724, filed Jun. 13, 2005 and published Mar. 9, 2006 as U.S. Publication No. US-2006-0050018, and/or Ser. No. 12/576, 550, filed Oct. 12, 2009, now U.S. Pat. No. 8,465,161, which are all hereby incorporated herein by reference in their entireties, or such as fabric-made position detectors, such as those described in U.S. Pat. Nos. 6,504,531; 6,501,465; 6,492,980; 6,452,479; 6,437,258 and 6,369,804, which are hereby incorporated herein by reference in their entireties.

Optionally, the user inputs or buttons may comprise user inputs for a garage door opening system, such as a vehicle based garage door opening system of the types described in U.S. Pat. Nos. 6,396,408; 6,362,771; 7,023,322 and 5,798, 688, which are hereby incorporated herein by reference in their entireties. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255, 442; 5,632,092; 5,798,688; 5,971,552; 5,924,212; 6,243, 003; 6,278,377; 6,420,975; 6,477,464; 6,946,978; 7,308, 341; 7,167,796; 7,657,052; 7,004,593 and/or 6,678,614, and/or U.S. patent application Ser. No. 10/538,724, filed Jun. 13, 2005 and published Mar. 9, 2006 as U.S. Publication No. US-2006-0050018, which are all hereby incorporated herein by reference in their entireties.

Optionally, the mirror assembly may include one or more other accessories at or within the mirror casing or otherwise associated with or near the mirror assembly, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093 and/or U.S. provisional application Ser. No. 61/785,565, filed May 15, 2009, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 7,657,052; 6,690,268; 5,938,321; 5,813, 745; 5,820,245; 5,673,994; 5,649,756; 5,178,448; 5,671, 996; 4,646,210; 4,733,336; 4,807,096; 6,042,253; 5,669, 698; 7,195,381; 6,971,775 and/or 7,249,860, microphones, such as disclosed in U.S. Pat. Nos. 6,243,003; 6,278,377 and/or 6,420,975, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot or object detection system, such as disclosed in U.S. Pat. Nos. 8,058,977; 7,720,580; 5,929, 786; 5,786,772; 7,492,281; 7,038,577 and 6,882,287, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, and/or U.S. provisional application Ser. No. 61/785,565, filed May 15, 2009, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 7,881,496; 7,526,103; 7,400,435; 6,690,268 and 6,847,487, and/or U.S. patent application Ser. No. 12/578,732, filed Oct. 14, 2009 and published Apr. 22, 2010 as U.S. Publication No. US-2010-0097469; and/or Ser. No. 12/508,840, filed Jul. 24, 2009 and published Jan. 28, 2010 as U.S. Publication No. US-2010-0020170, an alert system, such as an alert system of the types described in PCT Application No. PCT/US2010/25545, filed Feb. 26, 2010, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205 and/or 7,423,522, and/or an ONSTAR® system, a compass, such as disclosed in U.S. Pat. Nos. 5,924,212; 4,862,594; 4,937,945; 5,131,154; 5,255,442 and/or 5,632,092, a control system, such as a control system of the types described in PCT Application No. PCT/US10/38477, filed Jun. 14, 2010 and published Dec. 16, 2010 as International Publication No. WO2010/144900, and/or any other accessory or circuitry or the like (with the disclosures of the above-referenced patents and patent applications and provisional applications and PCT applications being hereby incorporated herein by reference in their entireties).

The accessory or accessories may be positioned at or within the mirror casing and may be included on or integrated in the printed circuit board positioned within the mirror casing, such as along a rear surface of the reflective element or elsewhere within a cavity defined by the casing, without affecting the scope of the present invention. The user actuatable inputs described above may be actuatable to control and/or adjust the accessories of the mirror assembly/system and/or an overhead console and/or an accessory module/windshield electronics module and/or the vehicle. The connection or link between the controls and the systems or accessories may be provided via vehicle electronic or communication systems and the like, and may be connected via various protocols or nodes, such as BLUETOOTH®, SCP, UBP, J1850, CAN J2284, Fire Wire 1394, MOST, LIN, FLEXRAY™, Byte Flight and/or the like, or other vehicle-based or in-vehicle communication links or systems (such as WIFI and/or IRDA) and/or the like, depending on the particular application of the mirror/accessory system and the vehicle. Optionally, the connections or links may be provided via wireless connectivity or links, such as via a wireless communication network or system, such as described in U.S. Pat. No. 7,004,593, which is hereby incorporated herein by reference in its entirety, without affecting the scope of the present invention.

Optionally, a reflective element assembly of the present invention (such as for an interior or exterior rearview mirror assembly) may include a photo sensor or light sensor (such as the types described in U.S. Pat. Nos. 6,831,268; 6,742,904; 6,737,629; 5,406,414; 5,253,109; 4,799,768; 4,793,690 and/or 7,004,593, which are hereby incorporated herein by reference in their entireties) at the rear or fourth surface of the reflective element assembly, such that the photo sensor detects light passing through the reflective element assembly. Examples of such configurations are described in U.S. Pat. Nos. 4,793,690; 5,550,677; 5,193,029 and/or 7,004,593, which are all hereby incorporated herein by reference in their entireties. The reflective element assembly thus may have a window or transmissive port or portion at the photo sensor. The reflective element assembly may have a fixed attenuation such that only a relatively small amount of light passes therethrough, such as about 12 to 25 percent of the light incident on the reflective element assembly, such that the signal to dark current ratio generated at the sensor may be substantially reduced. Because the photo sensor may have a relatively small sensing area, the sensor may not receive or sense a substantial amount of light passing through the reflective element assembly. Therefore, it is envisioned that a light concentrator (such as a lens and/or light channel and/or light pipe and/or other light concentrating device) may be positioned at the photo sensor to focus or direct the light passing through a larger area of the reflective element assembly onto the smaller sensing area of the photo sensor.

Note that mirror cells or reflective element assemblies such as described herein can be included in complete mirror assemblies that include a variety of added-features, such as lighting, telematics functionality and electronics, such as are disclosed in U.S. Pat. Nos. 7,657,052; 7,308,341; 7,195,381; 7,167,796; 7,004,593; 6,690,268; 6,477,464; 6,472,979; 6,445,287; 6,420,975; 6,294,989; 6,278,377; 6,243,003; 6,042,253; 5,938,321; 5,924,212; 5,813,745; 5,820,245; 5,669,698; 5,673,994; 5,671,996; 5,649,756; 5,632,092; 5,255,442; 5,178,448; 5,131,154; 4,937,945; 4,862,594; 4,807,096; 4,733,336 and/or 4,646,210, which are all hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vision display system for a vehicle, said vision display system comprising:

a plurality of cameras disposed at a vehicle equipped with said vision display system;

said plurality of cameras each having respective fields of view exterior of the equipped vehicle;

said plurality of cameras comprising a rear camera disposed at a rear portion of the equipped vehicle, a front camera disposed at a front portion of the equipped vehicle, a driver side camera disposed at a driver side portion of the equipped vehicle and a passenger side camera disposed at a passenger side portion of the equipped vehicle;

said rear camera comprising a backup camera;

a display system of the equipped vehicle comprising a display screen disposed in the interior cabin of the equipped vehicle and viewable by a driver of the equipped vehicle, said display screen having a diagonal dimension greater than 3.5 inches;

wherein said display screen is operable to display a surround view composite image derived from image data captured by said front, rear, driver side and passenger side cameras of the equipped vehicle;

a tow check function comprising a video zoom feature for use when reversing the equipped vehicle towards a trailer so the driver of the equipped vehicle can more readily align a trailer hitch of the equipped vehicle with a tongue of the trailer the driver of the equipped vehicle desires to hitch the equipped vehicle to;

wherein the trailer hitch of the equipped vehicle comprises a ball and wherein, during a trailer hitch maneuver of the equipped vehicle, the video zoom feature zooms to show on said display screen the region immediately behind the equipped vehicle where the ball of the trailer hitch of the equipped vehicle is located so that the driver can view the ball in video images shown on said display screen and also see the tongue of the trailer as the equipped vehicle approaches the trailer;

wherein said tow check function is actuatable by the driver of the equipped vehicle prior to or during a reversing maneuver;

wherein actuation of said tow check function zooms what is shown on said display screen from a broad view of where the ball of the trailer hitch of the equipped vehicle is located to a narrower view of where the ball of the trailer hitch of the equipped vehicle is located;

wherein said vision display system allows for first shifting of a vehicle transmission into reverse gear to commence a reversing maneuver and then prohibiting switching to a tow check or zoomed view for a threshold or minimum period of time;

wherein, after said threshold or minimum period of time has elapsed after said first shifting of the vehicle transmission into reverse gear to commence that reversing maneuver, the tow check or zoomed view remains available during that reversing maneuver even if the equipped vehicle is again shifted back into reverse gear in order to allow for the driver to make multiple attempts to align the trailer hitch of the equipped vehicle with the tongue of the trailer via shifting of the vehicle transmission in and out of reverse gear multiple times during that reversing maneuver; and wherein said threshold or minimum period of time is at least about three seconds.

2. The vision display system of claim 1, wherein said display screen is operable to display at least one of (a) navigation information and (b) infotainment information for viewing by the driver of the equipped vehicle other than when a reversing maneuver is being executed by the driver of the equipped vehicle.

3. The vision display system of claim 1, wherein said display screen has a diagonal dimension greater than five inches.

4. The vision display system of claim 3, wherein said display screen has an aspect ratio of about 16:9.

5. The vision display system of claim 1, wherein said driver side camera is disposed at an exterior sideview mirror assembly at the driver side of the equipped vehicle.

6. The vision display system of claim 1, wherein, within two seconds of an initial ignition on of the equipped vehicle, said vision display system is operable to display on said display screen video images captured by said backup camera.

7. The vision display system of claim 6, wherein said backup camera disposed at the rear of the equipped vehicle comprises a CMOS backup camera.

8. The vision display system of claim 1, wherein provision of said video zoom feature is prohibited until after elapse of a period of time following the driver shifting a vehicle transmission of the equipped vehicle into reverse gear to commence a reversing maneuver.

9. The vision display system of claim 1, wherein, after the equipped vehicle is shifted out of reverse gear and into a forward gear and the equipped vehicle is driven forward for more than a threshold distance or at more than a threshold speed or after the equipped vehicle's ignition is turned off, provision of said tow check function is prohibited for a threshold or minimum period of time after a subsequent first shifting of the vehicle transmission into reverse gear to commence a subsequent reversing maneuver.

10. The vision display system of claim 1, wherein, at initial ignition on of the equipped vehicle, initialization of any navigational system or infotainment system of the equipped vehicle is delayed or overridden upon shifting of a vehicle transmission of the equipped vehicle into reverse gear to commence a reversing maneuver in order to give priority to displaying on said display screen video images captured by said backup camera of the equipped vehicle during that reversing maneuver.

11. The vision display system of claim 1, wherein said vision display system prohibits switching to display on said display screen of a tow check or zoomed view at the same time as when a vehicle transmission of the equipped vehicle is shifted into reverse gear a first time to commence a reversing maneuver.

12. The vision display system of claim 11, wherein said vision display system allows for first shifting of the vehicle transmission into reverse gear to commence a reversing maneuver and then prohibiting switching to the tow check or zoomed view for a threshold or minimum period of time.

13. The vision display system of claim 1, wherein said vision display system crops the field of view of displayed images captured by said backup camera to show the region immediately behind the equipped vehicle where the ball of the trailer hitch of the equipped vehicle is located so that the driver can view the ball in images displayed on said display screen images and also see the tongue of the trailer in the displayed images as the vehicle approaches the trailer.

14. The vision display system of claim 1, wherein, even if the driver of the equipped vehicle actuates said tow check function for a first time during a reversing maneuver at or around the same time as shifting a vehicle transmission of the equipped vehicle into the reverse gear to commence that reversing maneuver, display on said display screen of the full view or uncropped view of the field of view of said backup camera is maintained for a predetermined period of time during which the displayed field of view of images displayed on said display screen cannot be changed by the driver of the equipped vehicle.

15. The vision display system of claim 14, wherein the full view or uncropped view of the field of view of said backup camera is at least about 130 degrees.

16. The vision display system of claim 14, wherein said backup camera comprises a zoom-capable backup camera.

17. A vision display system for a vehicle, said vision display system comprising:

a rear camera disposed at a rear portion of a vehicle equipped with said vision display system, said rear camera having a field of view exterior of the equipped vehicle;

said rear camera comprising a backup camera;

a display system of the equipped vehicle comprising a display screen disposed in the interior cabin of the equipped vehicle and viewable by a driver of the equipped vehicle, said display screen having a diagonal dimension greater than 3.5 inches;

a tow check function comprising a video zoom feature for use when reversing the equipped vehicle towards a trailer so the driver of the equipped vehicle can more readily align a trailer hitch of the equipped vehicle with the tongue of the trailer the driver of the equipped vehicle desires to hitch the equipped vehicle to;

wherein the trailer hitch of the equipped vehicle comprises a ball and wherein, during a trailer hitch maneuver of the equipped vehicle, the video zoom feature zooms to show on said display screen the region immediately behind the equipped vehicle where the ball of the trailer hitch of the equipped vehicle is located so that the driver can view the ball in video images shown on said display screen and also see the tongue of the trailer as the equipped vehicle approaches the trailer;

wherein said tow check function is actuatable by the driver of the equipped vehicle prior to or during a reversing maneuver;

wherein actuation of said tow check function zooms what is shown on said display screen from a broad view of where the ball of the trailer hitch of the equipped vehicle is located to a narrower view of where the ball of the trailer hitch of the equipped vehicle is located;

wherein, within two seconds of an initial ignition on of the equipped vehicle, said vision display system is operable to display on said display screen video images captured by said backup camera;

wherein provision of said video zoom feature is prohibited until after elapse of a period of time following the driver first shifting a vehicle transmission of the equipped vehicle into reverse gear to commence a reversing maneuver;

wherein, after a threshold or minimum period of time has elapsed after first shifting of the vehicle transmission into reverse gear to commence that reversing maneuver, the tow check or zoomed view remains available during that reversing maneuver even if the equipped vehicle is again shifted back into reverse gear in order to allow for the driver to make multiple attempts to align the trailer hitch of the equipped vehicle with the tongue of the trailer via shifting of the vehicle transmission in and out of reverse gear multiple times during that reversing maneuver; and wherein said threshold or minimum period of time is at least about three seconds.

18. The vision display system of claim 17, wherein the full view or uncropped view of the field of view of said backup camera is at least about 130 degrees and wherein said backup camera is a member of a plurality of cameras disposed at the equipped vehicle, said plurality of cameras each having respective fields of view exterior of the equipped vehicle, said plurality of cameras comprising said backup camera disposed at a rear portion of the equipped vehicle, a front camera disposed at a front portion of the equipped vehicle, a driver side camera disposed at a driver side portion of the equipped vehicle and a passenger side camera disposed at a passenger side portion of the equipped vehicle, and wherein said display screen is operable to display a surround view composite image derived from image data captured by said front, rear, driver side and passenger side cameras of the equipped vehicle.

19. The vision display system of claim 18, wherein said display screen is operable to display at least one of (a) navigation information and (b) infotainment information for viewing by the driver of the equipped vehicle other than when a reversing maneuver is being executed by the driver of the equipped vehicle, and wherein said display screen has a diagonal dimension greater than five inches.

20. The vision display system of claim 19, wherein, at initial ignition on of the equipped vehicle, initialization of any navigational system or infotainment system of the equipped vehicle is delayed or overridden upon shifting of the vehicle transmission of the equipped vehicle into reverse gear to commence a reversing maneuver in order to give priority to displaying video images captured by said backup camera of the equipped vehicle during that reversing maneuver.

21. A vision display system for a vehicle, said vision display system comprising:
a rear camera disposed at a rear portion of a vehicle equipped with said vision display system, said rear camera having a field of view exterior of the equipped vehicle;
said rear camera comprising a backup camera;
a display system of the equipped vehicle comprising a display screen disposed in the interior cabin of the equipped vehicle and viewable by a driver of the equipped vehicle, said display screen having a diagonal dimension greater than 3.5 inches;
a tow check function comprising a video zoom feature for use when reversing the equipped vehicle towards a trailer so the driver of the equipped vehicle can more readily align a trailer hitch of the equipped vehicle with a tongue of the trailer the driver of the equipped vehicle desires to hitch the equipped vehicle to;
wherein the trailer hitch of the equipped vehicle comprises a ball and wherein, during a trailer hitch maneuver of the equipped vehicle, the video zoom feature zooms to show on said display screen the region immediately behind the equipped vehicle where the ball of the trailer hitch of the equipped vehicle is located so that the driver can view the ball in video images shown on said display screen and also see the tongue of the trailer as the equipped vehicle approaches the trailer;
wherein said tow check function is actuatable by the driver of the equipped vehicle prior to or during a reversing maneuver;
wherein actuation of said tow check function zooms what is shown on said display screen from a broad view of where the ball of the trailer hitch of the equipped vehicle is located to a narrower view of where the ball of the trailer hitch of the equipped vehicle is located;
wherein, within two seconds of an initial ignition on of the equipped vehicle, said vision display system is operable to display on said display screen video images captured by said backup camera;
wherein provision of said video zoom feature is prohibited until after elapse of a period of time following the driver shifting a vehicle transmission of the equipped vehicle into reverse gear to commence a reversing maneuver;
wherein said vision display system allows for first shifting of the vehicle transmission into reverse gear to commence a reversing maneuver and then prohibiting switching to a tow check or zoomed view for a threshold or minimum period of time; and
wherein, after said threshold or minimum period of time has elapsed after said first shifting of the vehicle transmission into reverse gear in that reversing maneuver, the tow check or zoomed view remains available during that reversing maneuver even if the equipped vehicle is again shifted back into reverse gear in order to allow for the driver to make multiple attempts to align the trailer hitch of the equipped vehicle with the tongue of the trailer via shifting of the vehicle transmission in and out of reverse gear multiple times during that reversing maneuver; and
wherein said threshold or minimum period of time is at least about three seconds.

22. The vision display system of claim 21, wherein, after the equipped vehicle is shifted out of reverse gear and into a forward gear and the equipped vehicle is driven forward for more than a threshold distance or at more than a threshold speed or after the equipped vehicle's ignition is turned off, provision of said tow check function is prohibited for said threshold or minimum period of time after a subsequent first shifting of the vehicle transmission into reverse gear to commence a subsequent reversing maneuver.

23. The vision display system of claim 21, wherein the full view or uncropped view of the field of view of said backup camera is at least about 130 degrees, and wherein said backup camera is a member of a plurality of cameras disposed at the equipped vehicle, said plurality of cameras each having respective fields of view exterior of the equipped vehicle, said plurality of cameras comprising said backup camera disposed at a rear portion of the equipped vehicle, a front camera disposed at a front portion of the equipped vehicle, a driver side camera disposed at a driver side portion of the equipped vehicle and a passenger side camera disposed at a passenger side portion of the equipped vehicle, and wherein said display screen is operable to display a surround view composite image derived from image data captured by said front, rear, driver side and passenger side cameras of the equipped vehicle.

24. The vision display system of claim 23, wherein said display screen is operable to display at least one of (a) navigation information and (b) infotainment information for viewing by the driver of the equipped vehicle other than when a reversing maneuver is being executed by the driver of the equipped vehicle, and wherein said display screen has a diagonal dimension greater than five inches.

25. The vision display system of claim 24, wherein, at initial ignition on of the equipped vehicle, initialization of any navigational system or infotainment system of the equipped vehicle is delayed or overridden upon shifting of the vehicle transmission of the equipped vehicle into reverse gear to commence a reversing maneuver in order to give priority to displaying video images captured by said backup camera of the equipped vehicle during that reversing maneuver.

* * * * *